United States Patent
Hama

(10) Patent No.: US 8,726,530 B2
(45) Date of Patent: May 20, 2014

(54) RELATIVE ANGLE SENSING DEVICE AND ELECTRIC POWER STEERING APPARATUS

(75) Inventor: Yohei Hama, Tochigi (JP)

(73) Assignee: Showa Corporation, Saitama (JP)

( * ) Notice: Subject to any disclaimer, the term of this patent is extended or adjusted under 35 U.S.C. 154(b) by 189 days.

(21) Appl. No.: 13/495,285

(22) Filed: Jun. 13, 2012

(65) Prior Publication Data

US 2013/0168125 A1 Jul. 4, 2013

(30) Foreign Application Priority Data

Dec. 28, 2011 (JP) ................................. 2011-288629

(51) Int. Cl.
*G01B 5/24* (2006.01)
*G01D 5/347* (2006.01)

(52) U.S. Cl.
CPC .................................... *G01D 5/3473* (2013.01)
USPC ............................................. 33/1 PT; 33/534

(58) Field of Classification Search
CPC .............................. G01D 5/3473; B26D 15/02
USPC .................................. 33/1 AP, 1 N, 1 PT, 534
See application file for complete search history.

(56) References Cited

U.S. PATENT DOCUMENTS

| 5,301,434 A * | 4/1994 | Imaizumi ........................ 33/1 N |
| 6,244,884 B1 * | 6/2001 | Kerul ............................... 439/34 |
| 7,000,949 B2 * | 2/2006 | Bostic et al. .................... 439/34 |
| 8,578,616 B2 * | 11/2013 | Hamaguchi et al. .......... 33/1 PT |
| 2011/0287636 A1 * | 11/2011 | Zwickler ......................... 439/34 |
| 2013/0040468 A1 * | 2/2013 | Motomiya ...................... 439/34 |
| 2014/0021915 A1 * | 1/2014 | Staley et al. .................... 439/34 |

FOREIGN PATENT DOCUMENTS

JP 2007-187589 7/2007

* cited by examiner

*Primary Examiner* — G. Bradley Bennett
(74) *Attorney, Agent, or Firm* — Leason Ellis LLP

(57) ABSTRACT

A relative angle sensing device is provided with: a sensor that is contained in a housing in which a communication hole communicating inside and outside is formed, and outputs an electric signal according to a relative rotation angle between two rotary shafts coaxially arranged; an electric cable that transmits the electric signal outputted from the sensor to a device arranged at outside of the housing; an electric cable holding member that is fitted with the communication hole of the housing and that holds the electric cable; and an outer component that is arranged at a position outside the electric cable holding member in the communication hole of the housing. The outer component is provided with an introducing part that introduces the electric cable into inside thereof, and a plurality of exiting parts that make the electric cable having been introduced through the introducing part exit to outside in different directions.

6 Claims, 19 Drawing Sheets

FIG.8A
FIG.8B
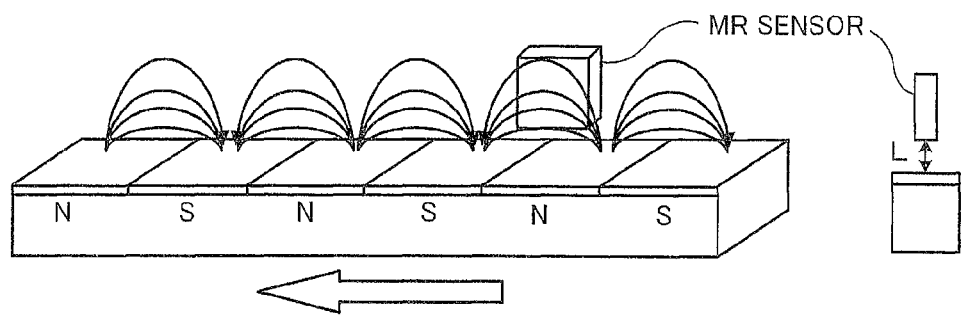
FIG.8C
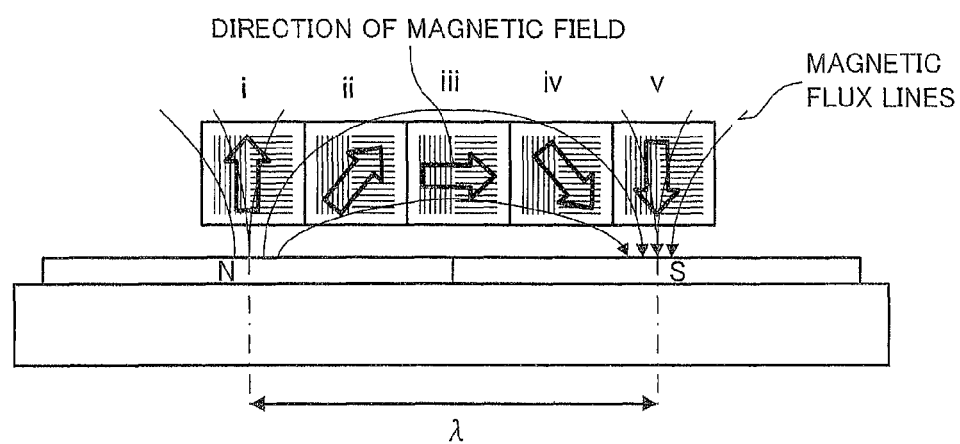
FIG.8D
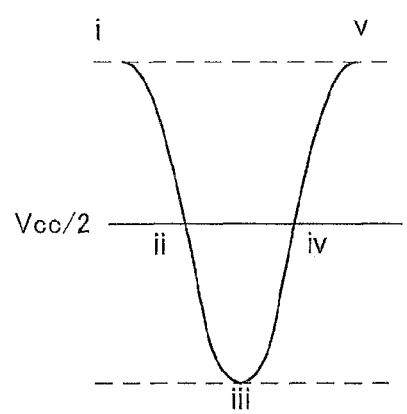

45 DEGREES

ELEMENT CONFIGURATION

RELATIVE ANGLE SENSING DEVICE AND ELECTRIC POWER STEERING APPARATUS

CROSS REFERENCE TO RELATED APPLICATIONS

This application is based on and claims priority under 35 USC §119 from Japanese Patent Application No. 2011-288629 filed Dec. 28, 2011.

BACKGROUND

1. Technical Field

The present invention relates to a relative angle sensing device and an electric power steering apparatus.

2. Related Art

Recently, there has been suggested a device for sensing a relative rotation angle between two rotary shafts coaxially arranged.

For example, a device described in Japanese Patent Application Laid Open Publication No. 2007-187589 is provided with: two magnetism collecting rings that are arranged around the outer periphery of a magnetic circuit formation component contained in a first rotating body and a second rotating body coaxially connected by a torsion bar so as to be isolated in an axial line direction, and collect a magnetic flux generated by the magnetic circuit formation component; a sensing part that senses torque applied to the first rotating body on the basis of the magnetic flux density collected by each of the magnetism collecting rings; a holding ring that holds the magnetism collecting rings and the sensing part, and has an attachment part attached to a housing, at the outer peripheral portion thereof; and a conductive wire that is connected to the sensing part. The sensing part is configured to change a sensed signal in accordance with change of the magnetic flux density generated between convex pieces of the magnetism collecting rings, and the sensed signal is given to a control part formed by using a microprocessor, through the conductive wire.

SUMMARY

In the case where a sensor (sensing part) contained in a housing and a device given a sensing signal from the sensor and arranged at outside of the housing are connected by an electric cable (conductive wire) held by an electric cable holding member (grommet) inserted into a penetration hole of the housing, there is a possibility that strong force may be applied to an end of the electric cable in the housing even if any force acts on the electric cable at the outside of the housing. For example, in the case where the end of the electric cable is connected to a connector and the connector is inserted into a connecting terminal, if strong force is applied to the end of the electric cable in the housing, there is a possibility that the electric cable may come off the connector or the connecting terminal into which the connector has been inserted may be broken. In addition, there is a possibility that a sealing property of the electric cable in the electric cable holding member (grommet) may be deteriorated due to application of force on the electric cable at the outside of the housing.

To avoid this, at a position outside the electric cable holding member in the penetration hole of the housing, a component that inhibits the electric cable holding member from being dropped and that makes force acting on the electric cable at the outside of the housing difficult to be transferred to an electric cable holding part of the electric cable holding member may be arranged.

In such a case, it is important to consider the position where another component exists at the outside of the housing varied among models on which a device for sensing the relative rotation angle is mounted.

In order to attain the above object, the present invention provides a relative angle sensing device including: a sensor that is contained in a housing in which a communication hole communicating inside and outside is formed, and outputs an electric signal according to a relative rotation angle between two rotary shafts coaxially arranged; an electric cable that transmits the electric signal outputted from the sensor to a device arranged at outside of the housing; an electric cable holding member that is fitted with the communication hole of the housing and that holds the electric cable; and an outer component that is arranged at a position outside the electric cable holding member in the communication hole of the housing. The outer component includes an introducing part that introduces the electric cable into inside thereof, and plural exiting parts that make the electric cable having been introduced through the introducing part exit to outside in different directions.

Here, the outer component may includes plural extending parts that extend in a direction intersecting with a hole direction of the communication hole of the housing, between the introducing part and the plural exiting parts.

Further, the outer component has plural introducing parts, and the plural extending parts are provided so that it is possible for plural electric cables that are introduced from the different introducing parts and exit from one exiting part out of the plural exiting parts to have approximately the same length at the outside of the outer component.

Furthermore, the outer component has a pair of divided components that is dividable in a direction intersecting with the hole direction of the communication hole of the housing, and the plural extending parts are formed on one divided component out of the pair of the divided components so as to extend toward the other divided component.

From another standpoint, the present invention provides an electric power steering apparatus including: a sensor that outputs an electric signal according to a relative rotation angle between two rotary shafts coaxially arranged; a housing that contains the sensor and forms a communication hole communicating inside and outside; an electric cable that transmits the electric signal outputted from the sensor to a device arranged at outside of the housing; an electric cable holding member that is fitted with the communication hole of the housing and that holds the electric cable; and an outer component that is arranged at a position outside the electric cable holding member in the communication hole of the housing. The outer component includes an introducing part that introduces the electric cable into inside thereof, and plural exiting parts that make the electric cable having been introduced through the introducing part exit to outside in different directions.

According to the present invention, even if the position where another component exists at the outside of the housing is varied among models, since an exiting part for making an electric cable exit is arbitrary selected, it is possible to use an outer component having the same configuration in different models.

BRIEF DESCRIPTION OF THE DRAWINGS

Exemplary embodiment(s) of the present invention will be described in detail based on the following figures, wherein:

FIGS. 8A to 8D are views for illustrating a relationship between the change of the direction of the magnetic field and the output of the MR sensor when the magnet moves in a straight line;

DETAILED DESCRIPTION

Hereinafter, an exemplary embodiment of the present invention will be described in detail with reference to the attached drawings.

Figure 1A:
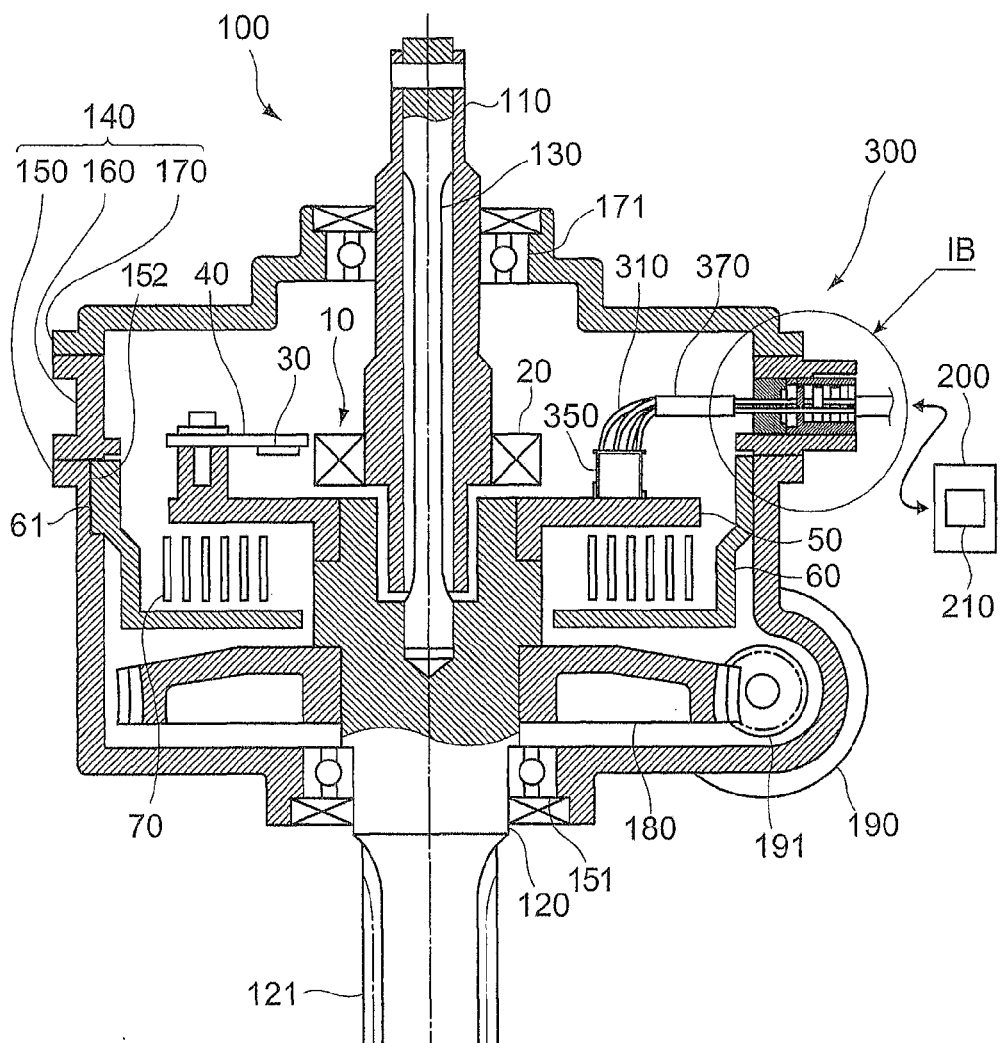
FIGS. 1A and 1B are cross-sectional views of an electric power steering apparatus to which a sensing device according to the exemplary embodiment is applied.
Figure 1B:
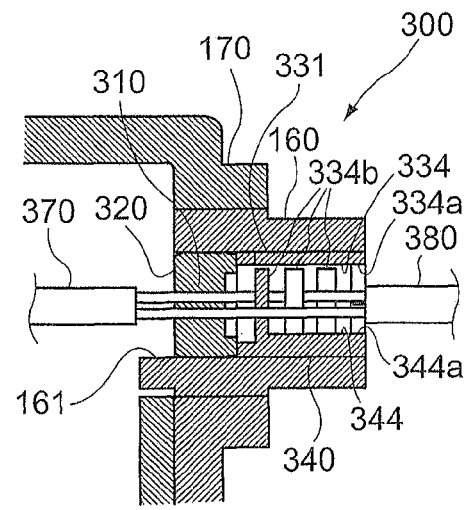
Figure 2:
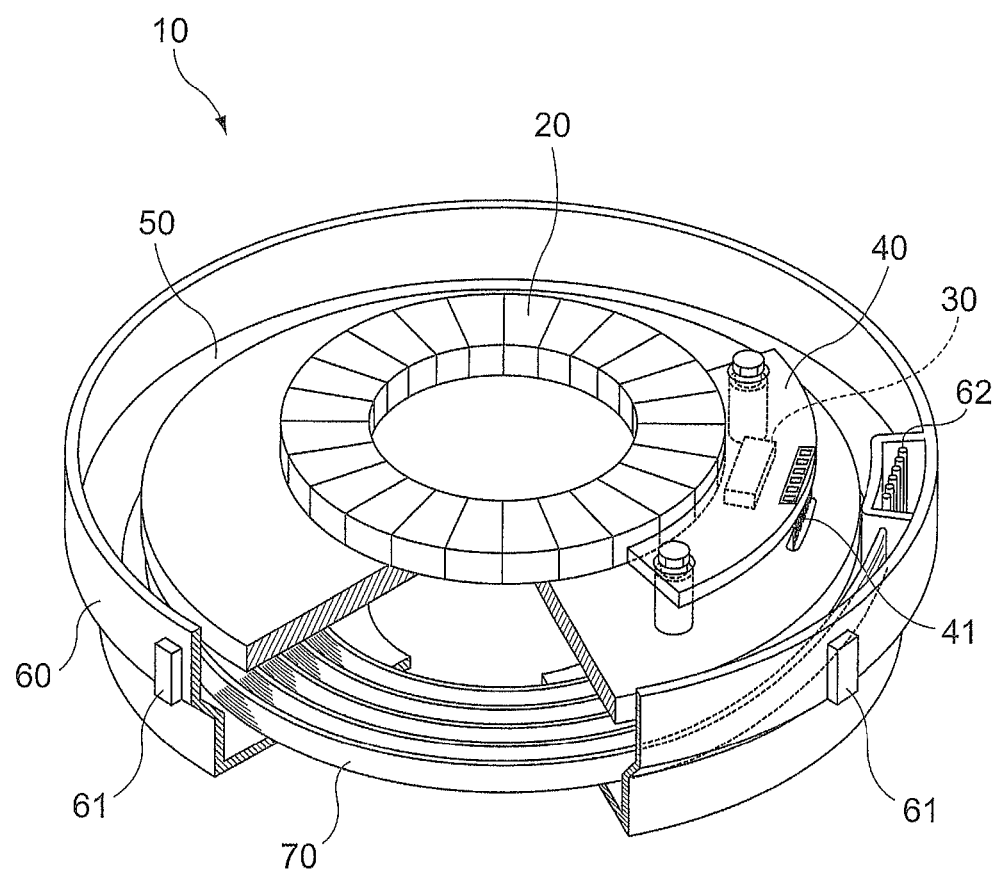
FIG. 2 is a perspective view of the sensing device according to the exemplary embodiment.

FIGS. 1A and 1B are cross-sectional views of an electric power steering apparatus 100 to which a sensing device 10 according to the exemplary embodiment is applied. FIG. 2 is a perspective view of the sensing device 10 according to the exemplary embodiment. Note that, in order to easily understand the configuration, a part of a base 50 and a flat cable cover 60 that will be described later is omitted in FIG. 2.

The electric power steering apparatus 100 is provided with a first rotary shaft 110 and a second rotary shaft 120 that coaxially rotate. The first rotary shaft 110 is a rotary shaft to which, for example, a steering wheel is connected, and the second rotary shaft 120 is coaxially joined to the first rotary shaft 110 through a torsion bar 130. A pinion 121 formed on the second rotary shaft 120 is engaged with a rack (not shown) of a rack shaft (not shown) which is connected to wheels, and rotary movement of the second rotary shaft 120 is converted into linear movement of the rack shaft through the pinion 121 and the rack, and thereby the wheels are steered.

The electric power steering apparatus 100 is provided with a housing 140 that rotatably supports the first rotary shaft 110 and the second rotary shaft 120. The housing 140 is a component fixed to a body frame (hereinafter, referred to as a "vehicle" in some cases) of a vehicle such as an automobile, and is formed of a first housing 150, a second housing 160 and a third housing 170.

The first housing 150 is a component having a shaft bearing 151 that rotatably supports the second rotary shaft 120, on one end side of the second rotary shaft 120 (lower side in FIG. 1A) in a rotary shaft direction (hereinafter, simply referred to as a "shaft direction" in some cases), and an opening on the other end side (upper side in FIG. 1A) in the shaft direction.

The second housing 160 is a component having openings on both end sides in the shaft direction, and is arranged so that one opening on one end side in the shaft direction faces the opening of the first housing 150 on the other end side in the shaft direction. The second housing 160 is fixed to the first housing 150 with, for example, a bolt or the like. On the side surface of the second housing 160, a communication hole 161 for communicating the inside and the outside thereof is formed. The communication hole 161 includes an inner communication hole 161a with which a later-described grommet 320 of a harness component 300 is fitted and that is approximately formed into an elliptic cylinder, and an outer communication hole 161b with which a socket 330 of the harness component 300 is fitted and that is approximately formed into an elliptic cylinder. The outer communication hole 161b has the short side of the ellipse having the same length as that of the inner communication hole 161a, and a longer long side thereof than that of the inner communication hole 161a. The second housing 160 has concave parts 162 (refer to FIGS. 15A to 15C) that are located in the middle of the communication hole 161 in the cylindrical direction of the elliptic cylinder (communication-hole direction), that are concave from a surface forming the outer communication hole 161b of the communication hole 161, and that are formed on both sides in the long side direction of the ellipse. Each of the concave parts 162 is a semicircular column, and has two vertical surfaces 162a vertical to the cylindrical direction.

The third housing 170 is a component having a shaft bearing 171 that rotatably supports the first rotary shaft 110 on the other end side in the shaft direction (upper side in FIG. 1A), and an opening on one end side in the shaft direction (lower side in FIG. 1A). The third housing 170 is arranged so that the opening on one end side in the shaft direction faces the opening of the second housing 160 on the other end side in the shaft direction, and is fixed to the second housing 160 with, for example, a bolt or the like.

The electric power steering apparatus 100 is provided with: a worm wheel 180 that is fixed to the second rotary shaft 120 by, for example, press fitting; and an electric motor 190 that has a worm gear 191 engaged with the worm wheel 180 and connected to the output shaft, and that is fixed to the first housing 150.

The electric power steering apparatus 100 is provided with: the sensing device 10 that outputs an electric signal according to the relative rotation angle between the first rotary shaft 110 and the second rotary shaft 120; and an electronic control unit (ECU) 200 that controls driving of the electric motor 190 on the basis of the output value of the sensing device 10.

The ECU 200 includes a relative angle calculator 210 that calculates the relative rotation angle between the first rotary shaft 110 and the second rotary shaft 120 on the basis of the output value from the sensing device 10 by using a CPU that executes various kinds of arithmetic processing, a ROM in which programs executed by the CPU, various kinds of data and the like are stored, and a RAM used as a working memory for the CPU and the like.

Detailed description of the sensing device 10 will be given later.

In the electric power steering apparatus 100 having the aforementioned configuration, since steering torque applied to the steering wheel appears as the relative rotation angle between the first rotary shaft 110 and the second rotary shaft 120, the steering torque is recognized on the basis of the relative rotation angle between the first rotary shaft 110 and the second rotary shaft 120. That is, the relative rotation angle between the first rotary shaft 110 and the second rotary shaft 120 is sensed by the sensing device 10, the ECU 200 recognizes the steering torque on the basis of the output value from the sensing device 10, and driving of the electric motor 190 is controlled on the basis of the recognized steering torque. Then, the generated torque of the electric motor 190 is transmitted to the second rotary shaft 120 through the worm gear 191 and the worm wheel 180. Thereby, the generated torque of the electric motor 190 assists steering force of a driver applied to the steering wheel.

Hereinafter, detailed description will be given for the sensing device 10.

The sensing device 10 is provided with: a magnet 20 that is attached to the first rotary shaft 110; a relative angle sensor 30 that outputs an electric signal according to the relative rotation angle between the first rotary shaft 110 and the second rotary shaft 120 on the basis of the magnetic field of the magnet 20 (magnetic field generated by the magnet 20); and a printed substrate 40 on which the relative angle sensor 30 is mounted. Further, the sensing device 10 is provided with: the base 50 that is attached to the second rotary shaft 120 and that supports the printed substrate 40; and the flat cable cover 60 in which a later-described flat cable 70 is contained, and that is formed into a cylinder with a bottom. Furthermore, the sensing device 10 is provided with: the flat cable 70 that has one end connected to a terminal arranged on the printed substrate 40, and the other end connected to a terminal fixed to the flat cable cover 60; and the harness component 300 that connects the ECU 200 and the terminal fixed to the flat cable cover 60.

The magnet 20 is formed into a cylinder (doughnut shape), the first rotary shaft 110 is fitted with the inner side thereof, and the magnet 20 rotates together with the first rotary shaft 110. North poles and south poles are alternately arranged in the circumferential direction of the first rotary shaft 110, and the magnet 20 is magnetized in the circumferential direction.

The relative angle sensor 30 is arranged outside the outer circumferential surface of the magnet 20 in a rotational radial direction of the first rotary shaft 110, and within a region in which the magnet 20 is provided in the shaft direction of the first rotary shaft 110. The relative angle sensor 30 according to the exemplary embodiment is a MR sensor (magnetoresistive element) that is a magnetic sensor using change in resistance by a magnetic field. The relative angle sensor 30 outputs the electric signal according to the relative rotation angle between the first rotary shaft 110 and the second rotary shaft 120 on the basis of the magnetic field of the magnet 20 (magnetic field generated by the magnet 20), and thereby the relative rotation angle between the two rotary shafts that are coaxially arranged is sensed. Detailed description will be given later for the relative angle sensor 30 and the sensing method of the relative rotation angle.

The printed substrate 40 is fixed to the base 50 with, for example, a bolt or the like so as to be arranged outside the outer circumferential surface of the magnet 20 in the rotational radial direction of the first rotary shaft 110.

The base 50 is a disc-shaped component, is fitted with the second rotary shaft 120, and rotates together with the second rotary shaft 120.

The flat cable cover 60 is a cylindrical component with a bottom, and is fixed to the housing 140. The following configuration is exemplified as a configuration in which the flat cable cover 60 is fixed to the housing 140. That is, plural convex parts 61 that are arranged on the outer circumferential surface of the flat cable cover 60 at regular intervals in the circumferential direction (4 convex parts arranged at intervals of 90 degrees in the exemplary embodiment) are formed so as to extend outside. On the other hand, on the first housing 150 of the housing 140, concave parts 151 the number of which is the same as the number of the convex parts 61 are formed, with which the convex parts 61 are fitted. By fitting the convex parts 61 of the flat cable cover 60 with the concave parts 151 formed on the first housing 150, the second rotary shaft 120 is positioned in the rotational direction. Further, by pressing the upper surface of the flat cable cover 60 with the second housing 160, positioning is conducted in the shaft direction. Alternatively, the flat cable cover 60 may be fixed to the first housing 150 or the second housing 160 with, for example, a bolt or the like.

One end of the flat cable 70 is connected to a terminal 41 of the printed substrate 40, the other end of the flat cable 70 is connected to a connecting terminal 62 arranged inside the flat cable cover 60, and the flat cable 70 is contained in a space formed by the inside of the flat cable cover 60 and one end surface of the base 50 in the shaft direction in a spirally wound state. The flat cable 70 is wound in a right-handed direction as shown in FIG. 2 when it is seen from the other end side in the shaft direction, and in a case where the steering wheel, that is, the first rotary shaft 110 and the second rotary shaft 120 are rotated in the right-handed direction, one end rotates in the right-handed direction according to the rotation of the second rotary shaft 120, and thus the number of windings increases in comparison with a neutral state in which the steering wheel is not rotated. On the other hand, in a case where the steering wheel is rotated in a left-handed direction, the number of windings decreases in comparison with the neutral state in which the steering wheel is not rotated.

The harness component 300 has a function for transmitting the output signal from the relative angle sensor 30 to the ECU 200. Detailed description will be given later for the harness component 300.

Hereinafter, description will be given for the relative angle sensor 30 according to the exemplary embodiment.

The relative angle sensor 30 according to the exemplary embodiment is a MR sensor (magnetoresistive element) using change in resistance according to a magnetic field.

First, an operating principle of the MR sensor will be described.

The MR sensor is formed of Si or a glass substrate, and a thin film that is formed thereon and is made of an alloy mainly containing a ferromagnetic metal such as Ni—Fe, and the resistance of the thin-film ferromagnetic metal changes in accordance with intensity of a magnetic field in a specific direction.

Figure 3:
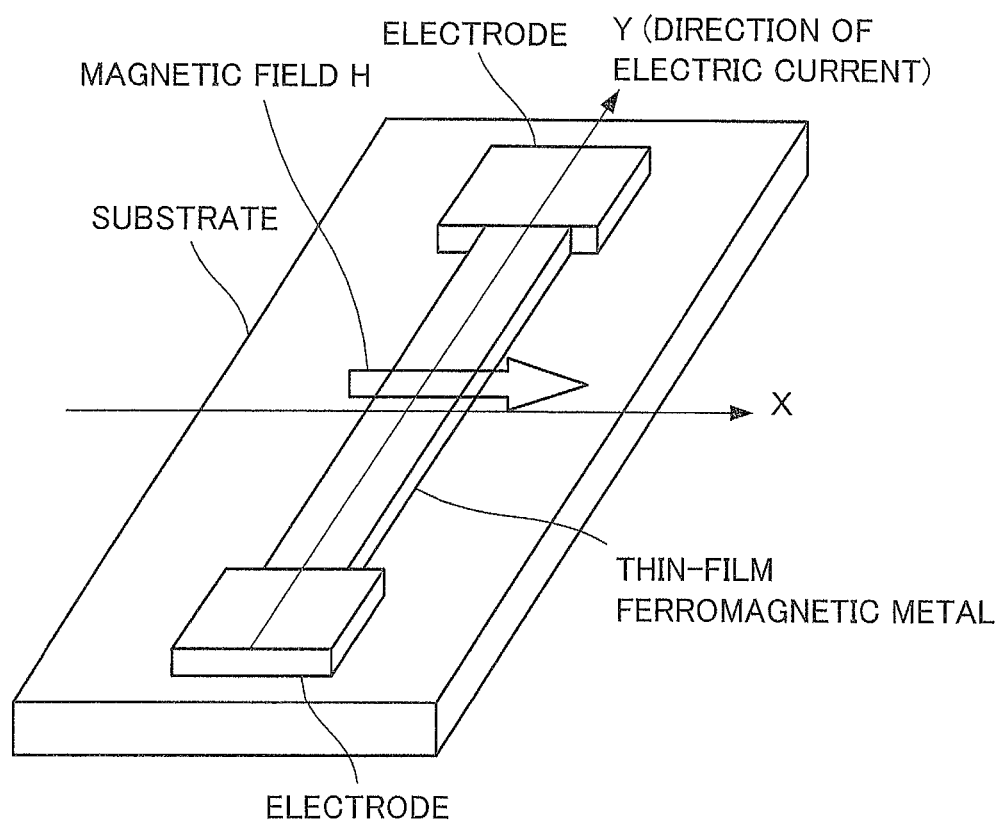
FIG. 3 is a view for illustrating a direction of an electric current applied to the thin-film ferromagnetic metal and a direction of an applied magnetic field.
Figure 4:
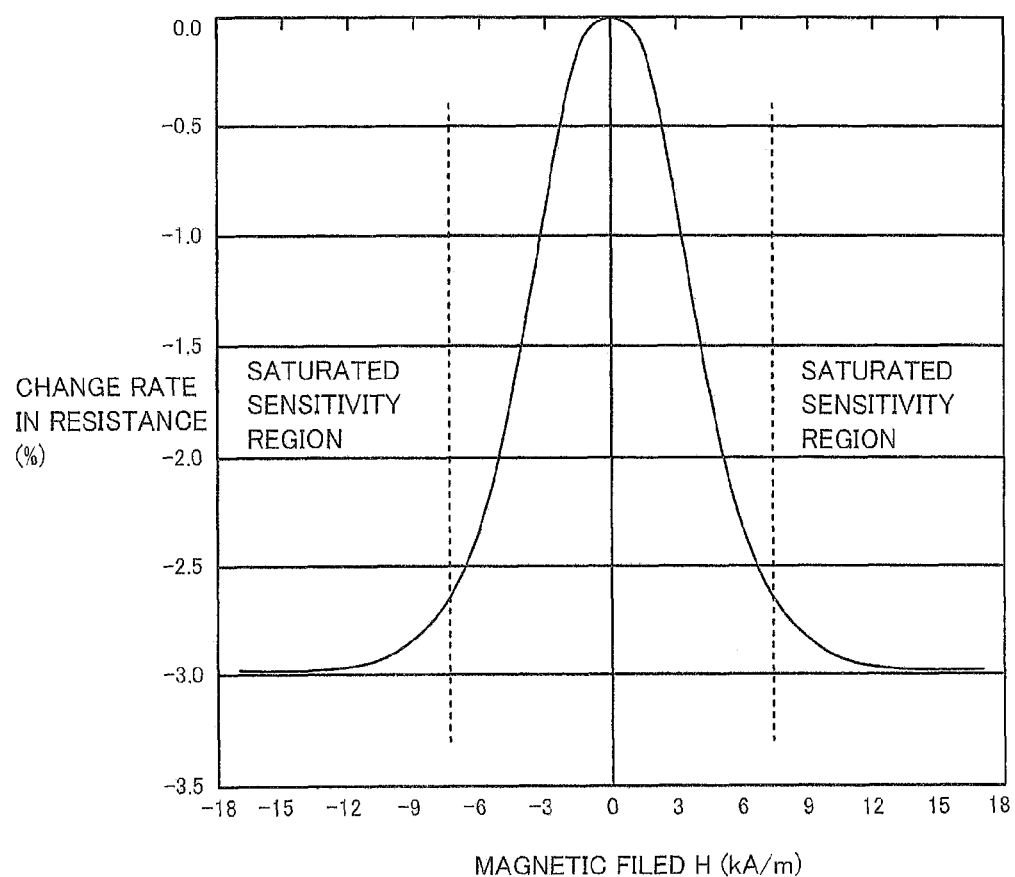
FIG. 4 is a graph for showing a relationship between intensity of the magnetic field and resistance of the thin-film ferromagnetic metal in a case where the intensity of the magnetic field is changed in the state shown in FIG. 3.

FIG. 3 is a view for illustrating a direction of an electric current applied to the thin-film ferromagnetic metal and a direction of an applied magnetic field. FIG. 4 is a graph for showing a relationship between intensity of the magnetic field and resistance of the thin-film ferromagnetic metal in a case where the intensity of the magnetic field is changed in the state shown in FIG. 3.

As shown in FIG. 3, an electric current is applied to the thin-film ferromagnetic metal forming into a rectangle on the substrate in a long side direction of the rectangle, that is, a Y direction in FIG. 3. On the other hand, a magnetic field H is applied thereto in a vertical direction (X direction in FIG. 3) with respect to the direction of the electric current (Y direction), and the intensity of the magnetic field is changed in this condition. It is FIG. 4 that shows how the resistance of the thin-film ferromagnetic metal is changed in such a condition.

As shown in FIG. 4, even if the intensity of the magnetic field is made to be changed, change in the resistance from a point at no magnetic field (point where the intensity of the magnetic field is zero) is up to approximately 3%.

Hereinafter, a region outside a region in which the amount of change in the resistance ($\Delta R$) is approximately represented by a formula, "$\Delta R \propto H^2$" is referred to as a "saturated sensitivity region." In the saturated sensitivity region, change in the resistance of 3% does not vary if the intensity of the magnetic field is not less than certain intensity (hereinafter, referred to as a "specified intensity of the magnetic field").

Figure 5:
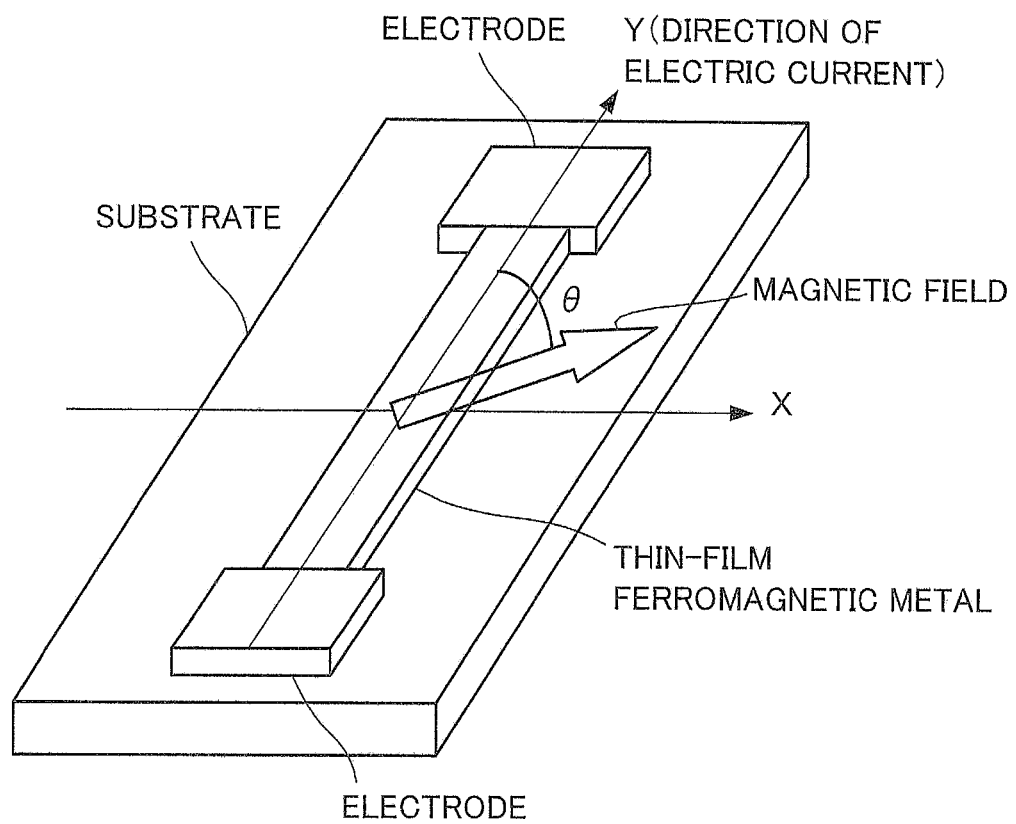
FIG. 5 is a view for illustrating a direction of an electric current applied to the thin-film ferromagnetic metal and a direction of an applied magnetic field.
Figure 6A:
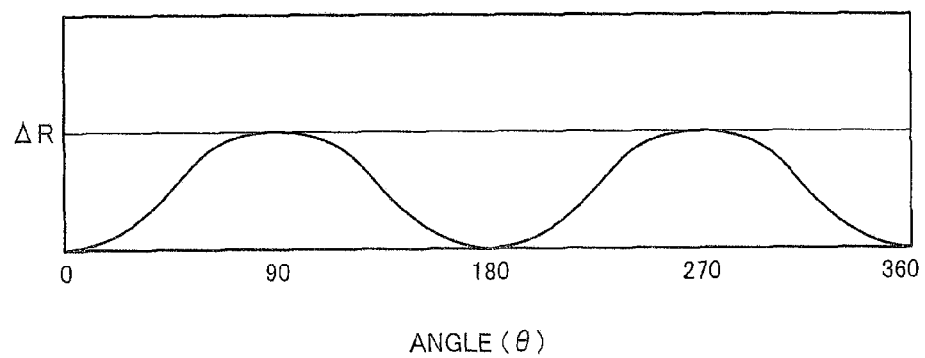
FIGS. 6A and 6B are graphs for showing a relationship between the direction of the magnetic field and the resistance of the thin-film ferromagnetic metal.
Figure 6B:
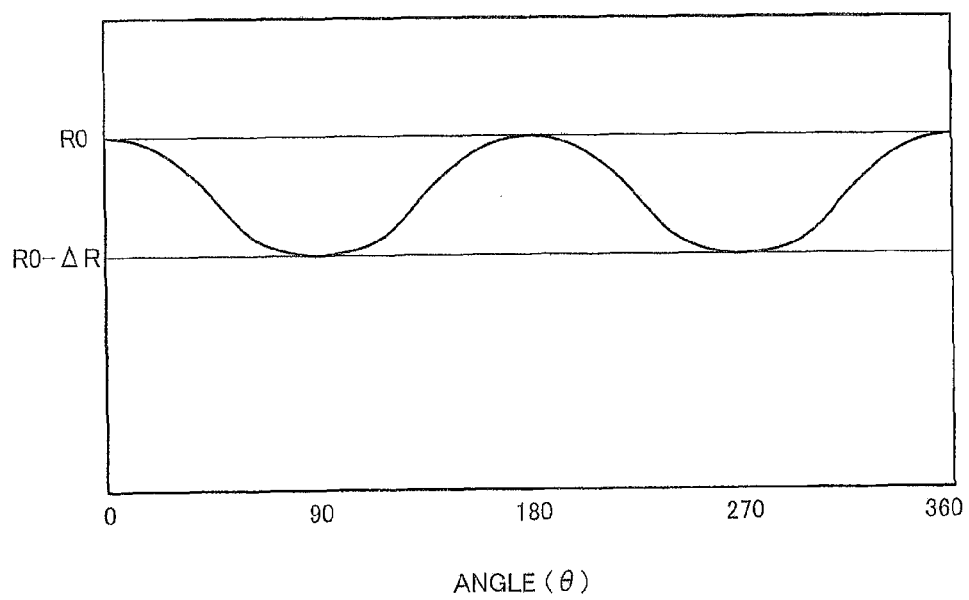

FIG. 5 is a view for illustrating a direction of an electric current applied to the thin-film ferromagnetic metal and a direction of an applied magnetic field. FIGS. 6A and 6B are graphs for showing a relationship between the direction of the magnetic field and the resistance of the thin-film ferromagnetic metal.

As shown in FIG. 5, an electric current is made to flow in a direction of the long side of the rectangle forming the thin-film ferromagnetic metal, that is, a Y direction in FIG. 5, and, as a direction of the magnetic field, change of an angle θ is given with respect to the direction of the electric current. At this time, in order to recognize change in the resistance of the thin-film ferromagnetic metal due to the direction of the magnetic field, the intensity of the magnetic field applied thereto is not less than the aforementioned specified intensity of the magnetic field at which the resistance does not change due to the intensity of the magnetic field.

As shown in FIG. 6A, the amount of change in the resistance is maximum when the direction of the electric current and the direction of the magnetic field are vertical to each other (θ=90 degrees, or 270 degrees), and is minimum when the direction of the electric current and the direction of the magnetic field are parallel to each other (θ=0 degree, or 180 degrees). If the maximum amount of change in the resistance in this case is set as $\Delta R$, the resistance R of the thin-film ferromagnetic metal changes as an angular component between the direction of the electric current and the direction of the magnetic field, is represented by an equation (1), and is shown in FIG. 6B.

$$R = R0 - \Delta R \sin^2 \theta \qquad (1)$$

Herein, R0 denotes the resistance in a case where the magnetic field not less than the specified intensity of the magnetic field is applied thereto so as to be parallel to the direction of the electric current (θ=0 degree or 180 degrees).

By the equation (1), the direction of the magnetic field not less than the specified intensity of the magnetic field can be sensed by recognizing the resistance of the thin-film ferromagnetic metal.

Next, a sensing principle of the MR sensor will be described.

Figure 7A:
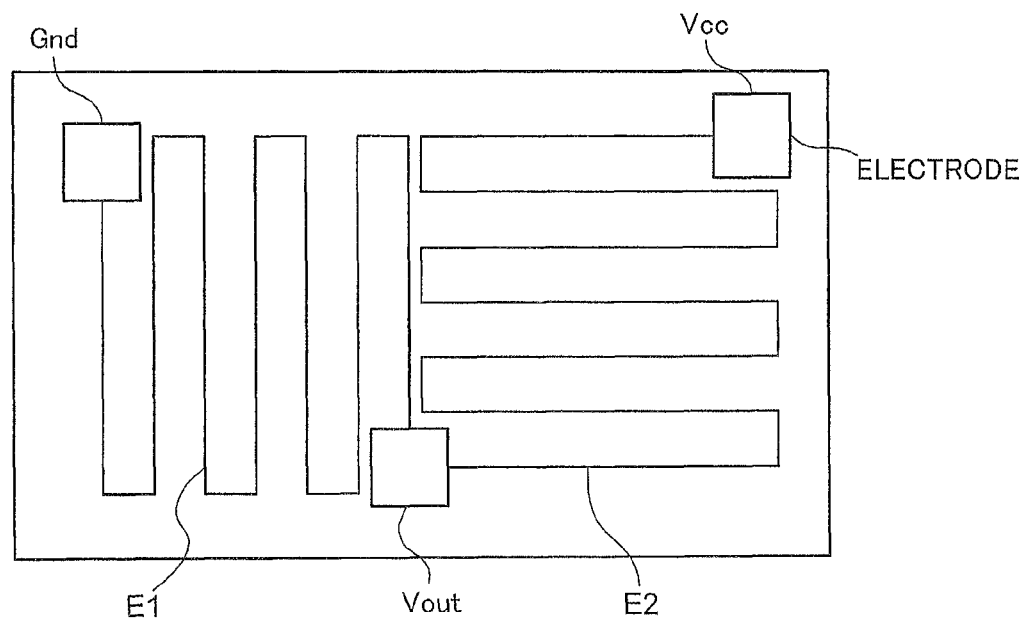
FIG. 7A is a view for illustrating an example of the MR sensor using a principle for sensing a direction of a magnetic field under intensity of a magnetic field not less than the specified intensity of the magnetic field.
Figure 7B:
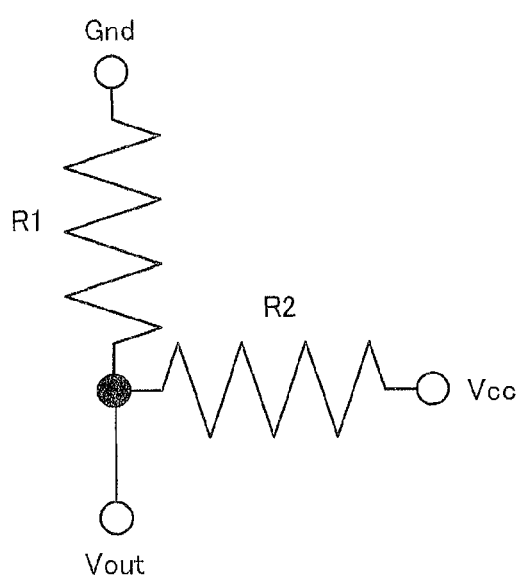
FIG. 7B is a view for illustrating the configuration of the MR sensor shown in FIG. 7A as an equivalent circuit.

FIG. 7A is a view for illustrating an example of the MR sensor using a principle for sensing a direction of a magnetic field under intensity of a magnetic field not less than the specified intensity of the magnetic field. FIG. 7B is a view for illustrating the configuration of the MR sensor shown in FIG. 7A as an equivalent circuit.

In the thin-film ferromagnetic metal of the MR sensor shown in FIG. 7A, a first element E1 that is formed so as to have a longer side in the vertical direction and a second element E2 that is formed so as to have a longer side in the horizontal direction are arranged in series.

In the thin-film ferromagnetic metal having such a shape, the magnetic field in the vertical direction, which leads to the maximum change in the resistance with respect to the first element E1, leads to the minimum change in the resistance with respect to the second element E2. The resistance R1 of the first element E1 is given by an equation (2), and the resistance R2 of the second element E2 is given by an equation (3).

$$R1 = R0 - \Delta R \sin^2 \theta \qquad (2)$$

$$R2 = R0 - \Delta R \cos^2 \theta \qquad (3)$$

The equivalent circuit of the MR sensor having the element configuration shown in FIG. 7A is shown in FIG. 7B.

As shown in FIGS. 7A and 7B, in a case where an end of the first element E1, which is not connected to the second element E2, is set as a ground (Gnd), and an end of the second element E2, which is not connected to the first element E1, is set to have an output voltage of Vcc, an output voltage Vout at a connecting part between the first element E1 and the second element E2 is given by an equation (4).

$$V\text{out} = (R1/(R1+R2)) \times V\text{cc} \qquad (4)$$

When the equations (2) and (3) are substituted into the equation (4) and the resultant equation is reorganized, an equation (5) is obtained.

$$V\text{out} = V\text{cc}/2 + \alpha \times \cos 2\theta \qquad (5)$$

Herein, $\alpha = (\Delta R/(2 \times (2 \times R0 - \Delta R))) \times V\text{cc}$.

By the equation (5), the direction of the magnetic field is recognized by sensing the Vout.

FIGS. 8A to 8D are views for illustrating a relationship between the change of the direction of the magnetic field and the output of the MR sensor when the magnet moves in a straight line.

As shown in FIG. 8A, the MR sensor shown in FIGS. 7A and 7B is arranged with respect to the magnet in which north poles and south poles are alternately arranged so that the intensity of the magnetic field not less than the specified intensity of the magnetic field is applied thereto with a gap L (distance between the magnet and the MR sensor), and change of the direction of the magnetic field affects a sensor surface of the MR sensor.

Then, the magnet is made to move to the left as shown in FIG. 8A, by a distance λ from the center of the north pole to the center of the south pole (hereinafter, referred to as a "magnetized pitch" in some cases), which is shown in FIG. 8C. In this case, the magnetic field whose direction is shown with an arrow in FIG. 8C is applied to the MR sensor in accordance with the position of the magnet, and the direction of the magnetic field is half rotated on the sensor surface when the magnet moves by the magnetized pitch λ. Hence, a waveform of the output voltage Vout at the connecting part between the first element E1 and the second element E2 has one cycle as shown in FIG. 8D because of the equation (5), "Vout=Vcc/2+α×cos 2θ."

Figure 9A:
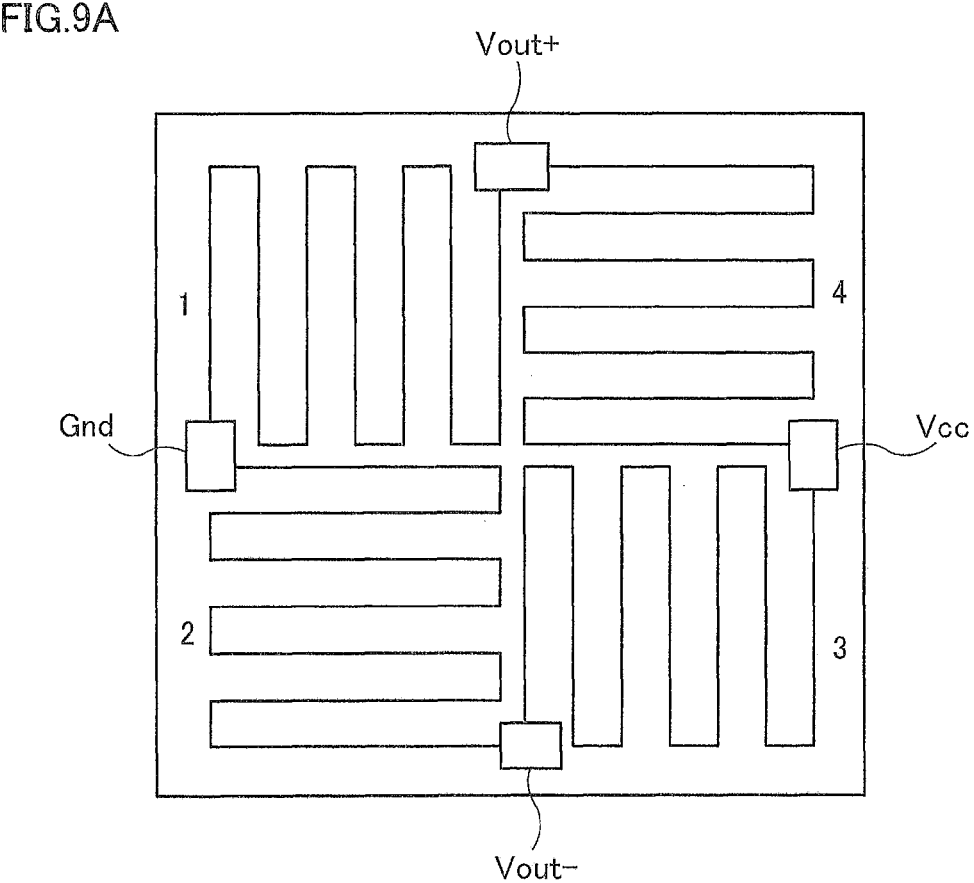
FIGS. 9A and 9B are views for illustrating another example of the MR sensor.
Figure 9B:
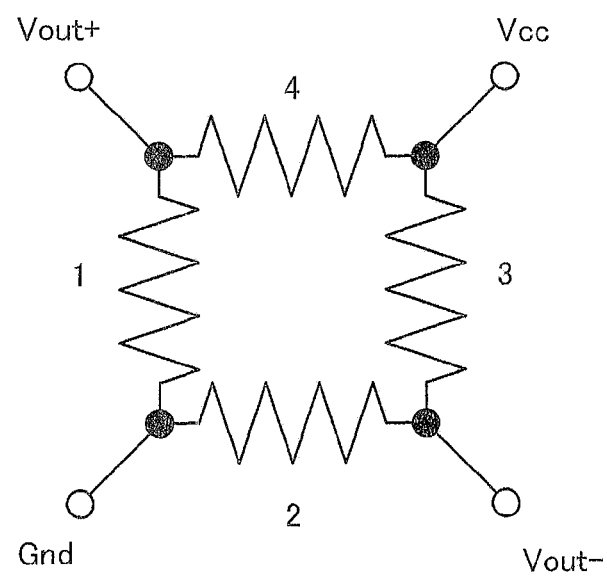

FIGS. 9A and 9B are views for illustrating another example of the MR sensor.

Instead of the element configuration shown in FIGS. 7A and 7B, if an element configuration shown in FIG. 9A is adopted, a well-known configuration having a Wheatston bridge (full bridge) is achieved, as shown in FIG. 9B. Thus, by using the MR sensor having the element configuration shown in FIG. 9A, it is possible to enhance a sensing accuracy.

Description will be given for a method for sensing a moving direction of the magnet.

From the relationship between the direction of the magnetic field and the resistance of the thin-film ferromagnetic metal shown in FIGS. 6A and 6B and the equation (1), "R=R0−ΔR sin²θ," the resistance of the thin-film ferromagnetic metal is the same in both cases in which the direction of the magnetic field is made to be rotated in a clockwise direction with respect to the direction of the electric current, and in a counterclockwise direction when it is seen in FIG. 5. Accordingly, although the resistance of the thin-film ferromagnetic metal is recognized, the moving direction of the magnet cannot be recognized.

Figure 10:
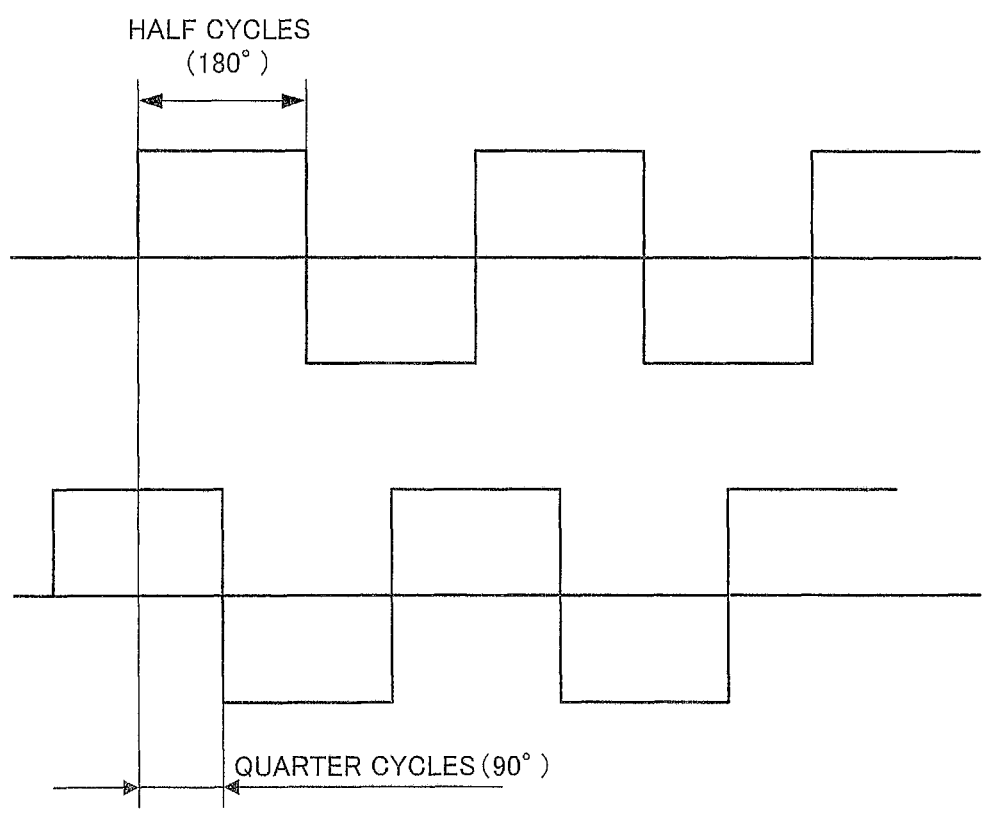
FIG. 10 is a diagram for illustrating one example of a combination of outputs used for sensing a moving direction of the magnet.

FIG. 10 is a diagram for illustrating one example of a combination of outputs used for sensing a moving direction of the magnet. As shown in FIG. 10, by combining two outputs having phase difference of quarter cycles, the moving direction of the magnet can be sensed. In order to obtain these outputs, two MR sensors are arranged so as to have a phase relationship such as (i) and (ii) or (i) and (iv) shown in FIG. 8C.

Figure 11A:
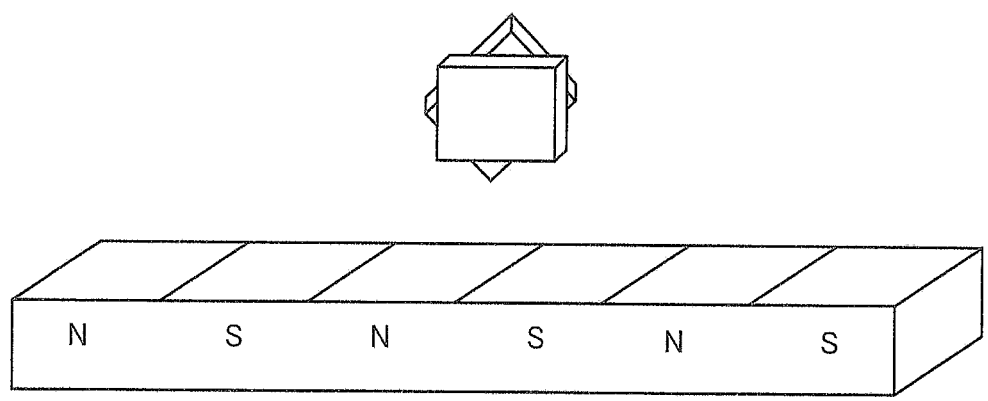
FIGS. 11A and 11B are views for illustrating an example of an arrangement of the MR sensors.
Figure 11B:
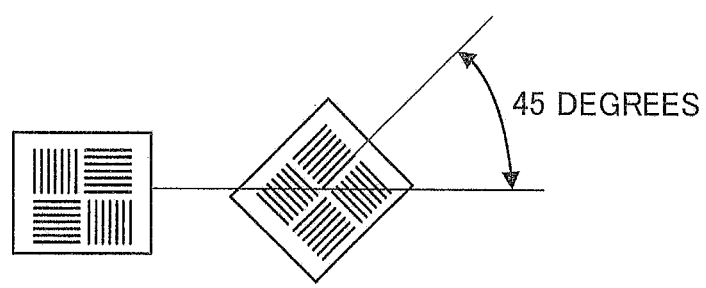

FIGS. 11A and 11B are views for illustrating an example of an arrangement of the MR sensors. As shown in FIG. 11A, two MR sensors may be stacked, and as shown in FIG. 11B, one MR sensor out of the two MR sensors may be arranged to have an angle of 45 degrees with respect to the other sensor.

Figure 12A:
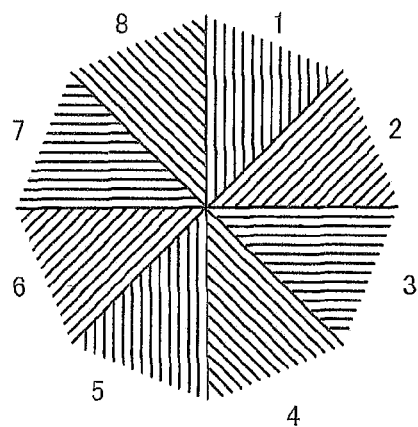
FIGS. 12A to 12C are diagrams for illustrating another example of the MR sensor.
Figure 12B:
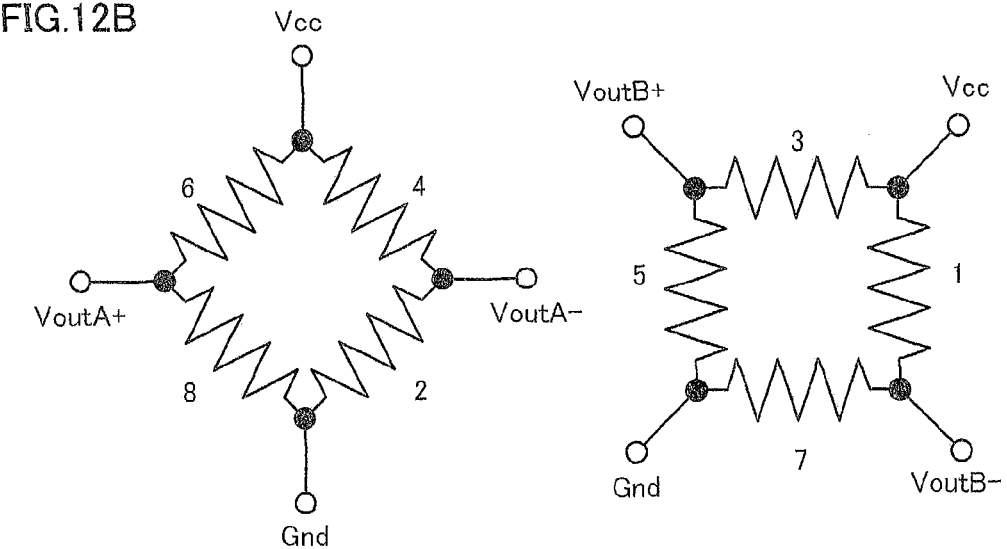
Figure 12C:
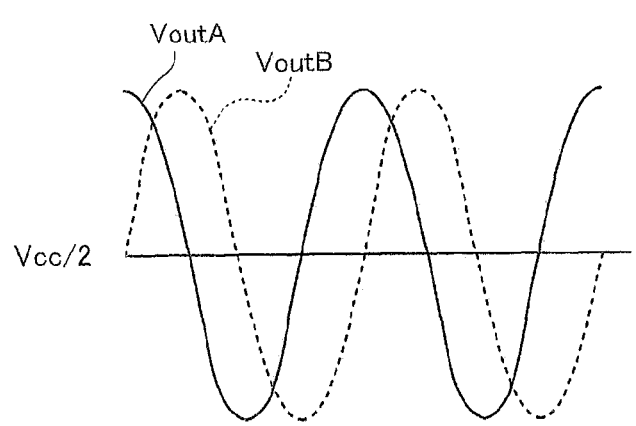

FIGS. 12A to 12C are diagrams for illustrating another example of the MR sensor. As shown in FIG. 12A, two pairs of elements each having a full-bridge configuration are formed on one substrate so as to have an angle of 45 degrees with respect to each other, and the element configuration forming an equivalent circuit shown in FIG. 12B may be considered. By this configuration, as shown in FIG. 12C, it is possible to output accurate sine and cosine waves by one MR sensor. Thus, the moving direction and the amount of the movement of the magnet with respect to the MR sensor can be recognized by the output value of the MR sensor having the element configuration shown in FIGS. 12A to 12C.

In consideration of the aforementioned characteristics of the MR sensor, the MR sensor having the element configuration shown in FIGS. 12A to 12C is used as the relative angle sensor 30 in the sensing device 10 according to the exemplary embodiment. The relative angle sensor 30 is vertically arranged with respect to the outer circumferential surface of the magnet 20, and the position of the second rotary shaft 120 in the shaft direction is within the region of the magnet 20, as described above. Thus, in this case, the relative angle sensor 30 shows change of the direction of the magnetic field shown in FIG. 8C in accordance with the position of the magnet 20 by the magnetic field of the magnet 20 rotating together with the first rotary shaft 110.

As a result, when the magnet 20 moves (rotates) by the magnetized pitch λ, the direction of the magnetic field half rotates on the magnetically sensitive surface of the relative angle sensor 30 and the output values Vout A and Vout B from the relative angle sensor 30 are cosine and sine curves (waves) having phase difference of the quarter cycles as shown in FIG. 12C, respectively.

That is, when a driver rotates the steering wheel, the first rotary shaft 110 also rotates according to this rotation, and the torsion bar 130 twists. Then, the second rotary shaft 120 rotates a little later than the first rotary shaft 110. This delay appears as difference between the rotation angles of the first rotary shaft 110 and the second rotary shaft 120 that are connected to the torsion bar 130. The sensing device 10 outputs Vout A and Vout B that are the cosine and sine curves having phase difference of the quarter cycles according to the difference between the rotation angles.

Note that, the magnetically sensitive surface of the relative angle sensor 30 indicates a surface on which a magnetic field can be sensed in the relative angle sensor 30.

The relative angle calculator 210 of the ECU 200 calculates a relative rotation angle θt between the first rotary shaft 110 and the second rotary shaft 120 by using a following equation (6) on the basis of the output values Vout A and Vout B of the relative angle sensor 30.

$$\theta t = \arctan(Vout\,B/Vout\,A) \quad (6)$$

As described above, it is possible for the relative angle calculator 210 to recognize the relative rotation angle between the first rotary shaft 110 and the second rotary shaft 120 and the twisting direction, that is, the amount and the direction of the torque applied to the steering wheel, on the basis of the output values from the relative angle sensor 30.

When the sensing device 10 having the aforementioned configuration is attached, the flat cable cover 60, the base 50 to which the printed substrate 40 has been attached, and the flat cable 70 contained between the flat cable cover 60 and the base 50 are unitized in advance. This unit is attached to the first housing 150 to which the second rotary shaft 120 has been attached so that the convex parts 61 of the flat cable cover 60 are fitted with the concave parts 151 of the first housing 150. At this time, the base 50 is attached to the second rotary shaft 120.

As described above, it is possible to improve an assembly property by making the sensing device 10 unitizable in advance.

Next, the harness component 300 will be described.

Figure 13:
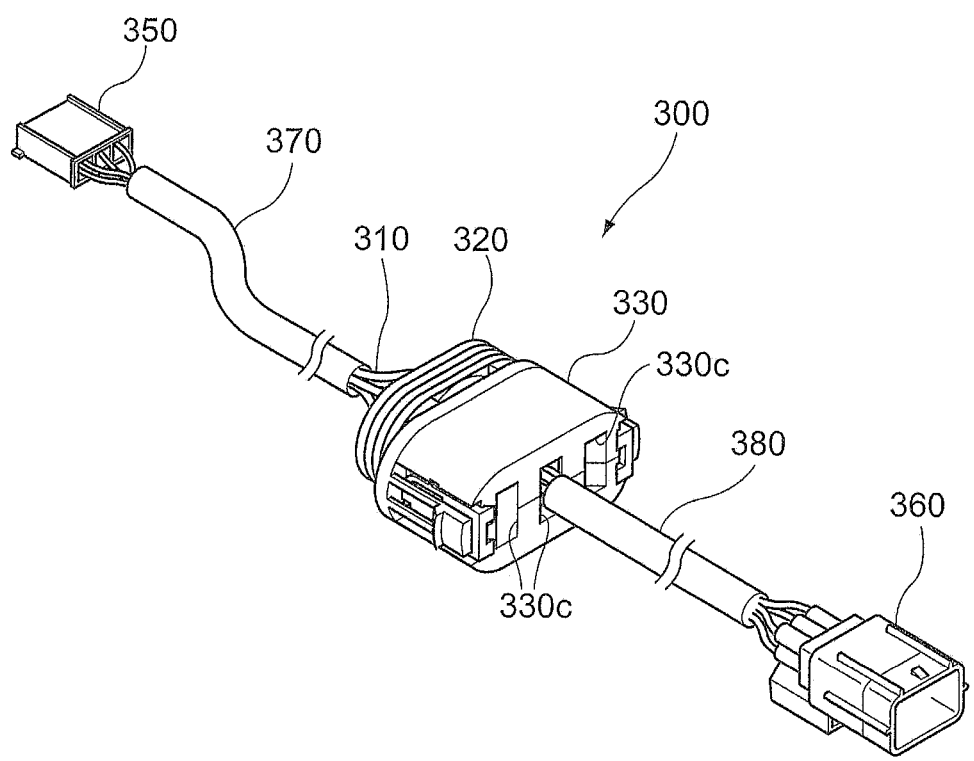
FIG. 13 is an external view of the harness component according to the exemplary embodiment.

FIG. 13 is an external view of the harness component 300 according to the exemplary embodiment.

The harness component 300 is provided with: plural electric cables 310; the grommet 320 as an example of an electric cable holding member that holds the plural electric cables 310; and the socket 330 that keeps the grommet 320 from moving. Further, the harness component 300 is provided with: a first connector 350 that is connected to one end of the plural electric cables 310; and a second connector 360 that is connected to the other end of the plural electric cables 310. Furthermore, the harness component 300 is provided with: a first cover 370 that bundles the plural electric cables 310 between the grommet 320 and the first connector 350; and a second cover 380 that bundles the plural electric cables 310 between the grommet 320 and the second connector 360.

The harness component 300 according to the exemplary embodiment has four electric cables 310, one end of these four electric cables 310 is connected to the printed substrate 40 through the first connector 350 and the like, and the other end of these four electric cables 310 is connected to the ECU 200 through the second connector 360 and the like. The four electric cables 310 are used for electric supply from the ECU 200 to the relative angle sensor 30 and transmission of the output values from the relative angle sensor 30 to the ECU 200.

The electric cables 310 are an electric conductor such as a linearly elongated metal, which has been covered with an insulator, and have an electric conductivity. The harness component 300 according to the exemplary embodiment has four electric cables 310, one end of these four electric cables 310 is connected to the first connector 350, the other end thereof is connected to the second connector 360, and they are bundled by the first cover 370 and the second cover 380 as an insulator.

Figures 14A, 14B:
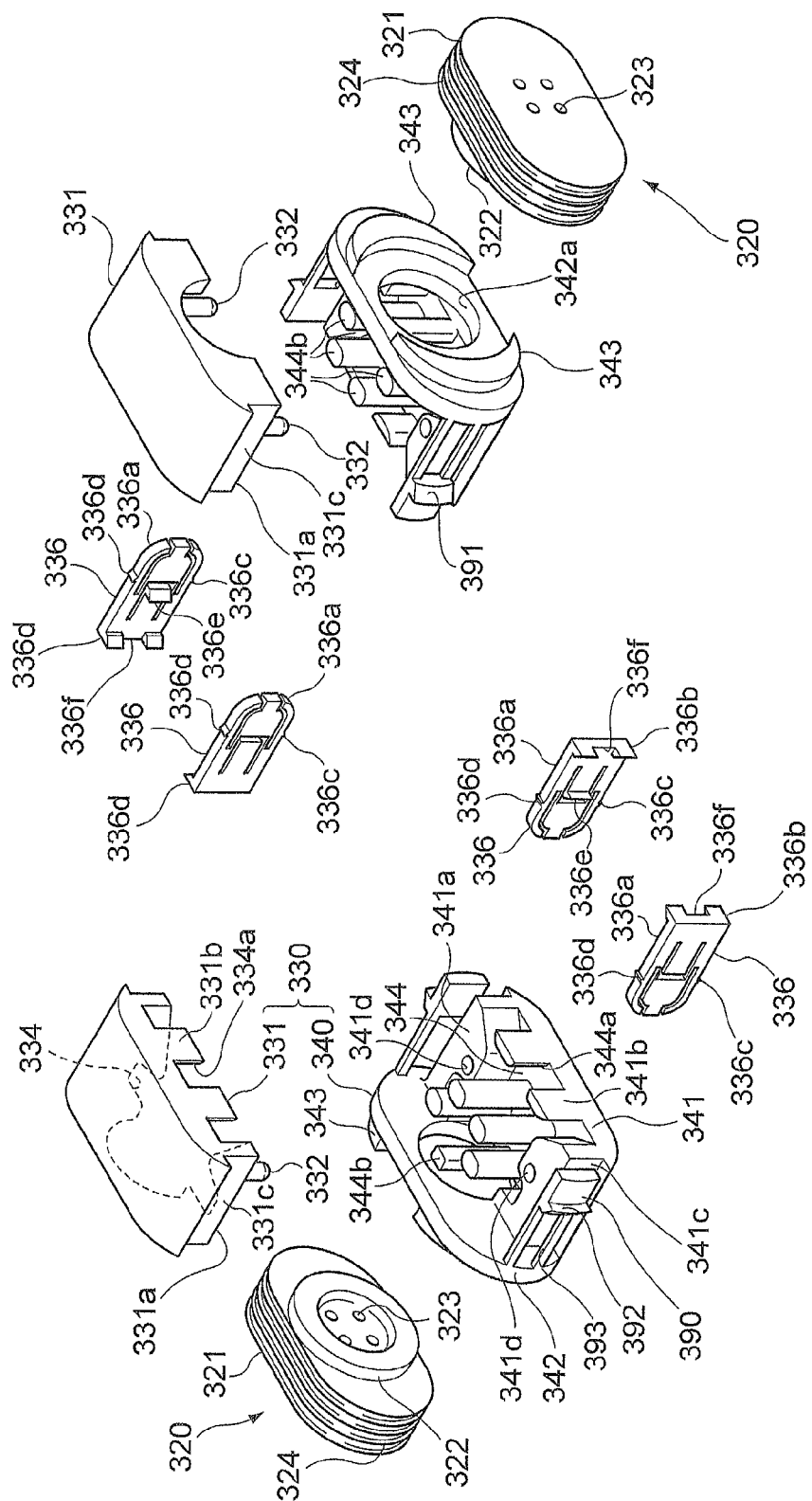
FIGS. 14A and 14B are schematic configuration views of the grommet and the socket.

FIGS. 14A and 14B are schematic configuration views of the grommet 320 and the socket 330. FIG. 14A is a perspective view seen from the second connector 360 side, and FIG. 14B is a perspective view seen from the first connector 350 side.

Figure 15A:
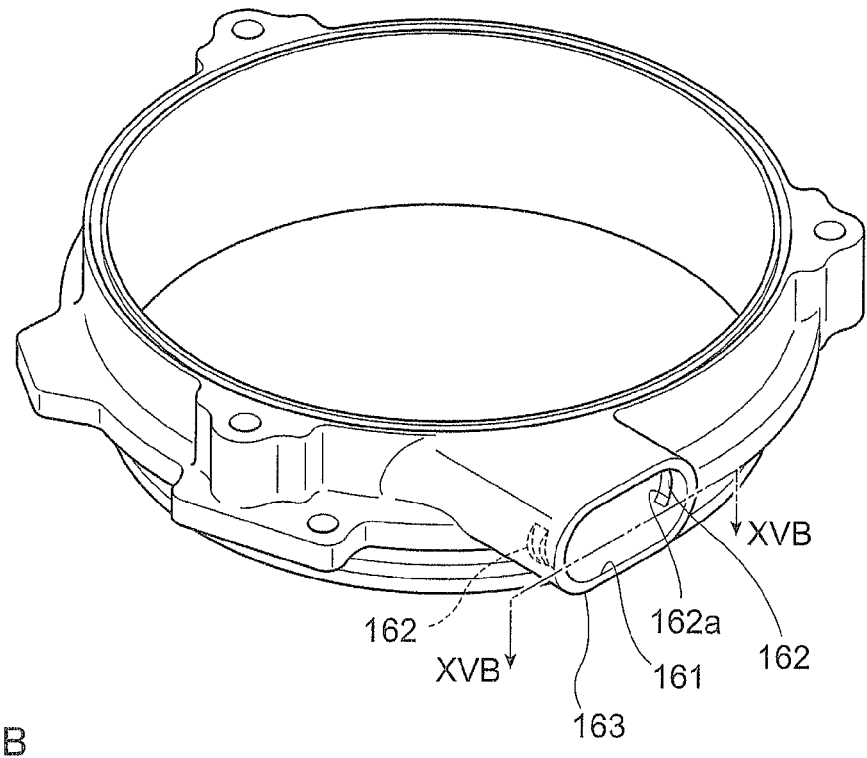
FIG. 15A is a schematic configuration view of the second housing.
Figure 15B:
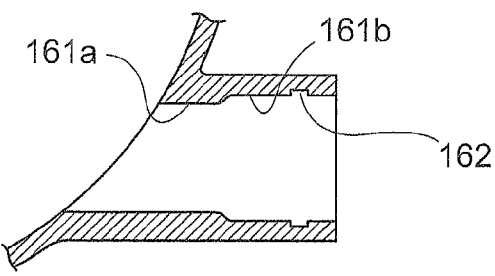
FIG. 15B is a cross-sectional view taken along a line XVB-XVB in FIG. 15A.
Figure 15C:
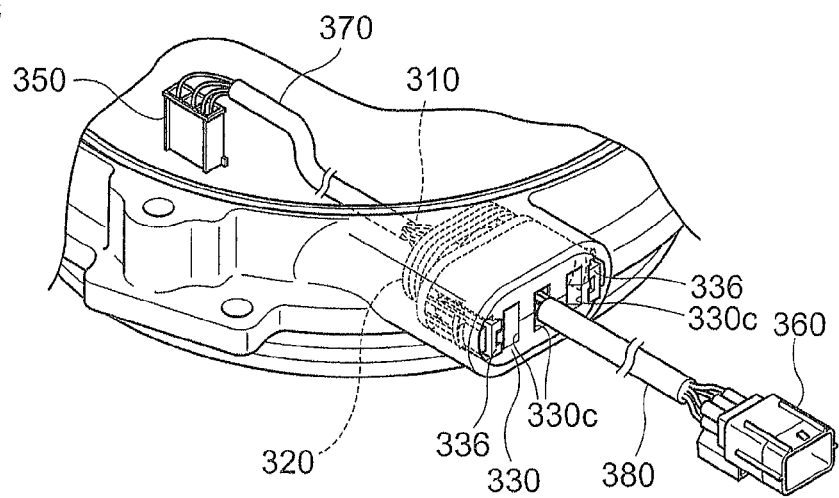
FIG. 15C is a view for illustrating a state where the harness component is mounted on the second housing.

FIG. 15A is a schematic configuration view of the second housing 160. FIG. 15B is a cross-sectional view taken along a line XVB-XVB in FIG. 15A. FIG. 15C is a view for illustrating a state where the harness component 300 is mounted on the second housing 160.

The grommet 320 includes an elliptic cylindrical part 321 that is approximately formed into an elliptic cylinder, and a cylindrical part 322 that is formed into a cylinder. In the elliptic cylindrical part 321, electric cable holes 323 are formed in a cylindrical direction for making the electric cables 310 pass therethrough. Here, the number of the electric cable holes 323 is the same as the number of the electric cables 310 (in the exemplary embodiment, four electric cable holes 323 are formed). On the outer peripheral surface of the elliptic cylindrical part 321, plural projections 324 (three projections in the exemplary embodiment) that project from the outer peripheral surface to the outside are provided in the cylindrical direction (hole direction of the electric cable holes 323 (hereinafter, referred to as an "electric cable hole direction" in some cases)) throughout the whole periphery in the peripheral direction. The outermost peripheral part of the projection 324 has larger size than the inner communication hole 161a of the communication hole 161 of the second housing 160. The outer peripheral surface of the elliptic cylindrical part 321 has the same as or a little bit smaller than the inner peripheral surface of a peripheral wall 163 forming the inner communication hole 161a of the communication hole 161 of the second housing 160. Thus, in a state where the grommet 320 is fitted with the second housing 160, by making the projections 324 projecting from the outer peripheral surface to the outside pressed by the peripheral wall 163, the elliptic cylindrical part 321 as a whole elastically deforms to the inner side. Accordingly, the grommet 320 seals the inner communication hole 161a of the communication hole 161 of the second housing 160, and presses the electric cables 310 inserted into the electric cable holes 323 at a peripheral parts of the electric cable holes 323, which suppresses movement of the electric cables 310. Note that, the grommet 320 is formed by vulcanizing an elastic material such as rubber, and formed into the aforementioned shape.

The socket 330 has a pair of divided components that is dividable in a direction intersecting with the hole direction of the communication hole 161 of the second housing. In the exemplary embodiment, it is dividable in the shaft direction, and includes a lower component 340 arranged at the lower side and an upper component 331 arranged at the upper side in FIGS. 14A and 14B. Further, the socket 330 has plural retaining components 336 (two retaining components 336 in the exemplary embodiment) that are arranged between the lower component 340 and the upper component 331 and prevents the socket 330 from being dropped from the communication hole 161 of the second housing 160. This socket 330 is formed by injection molding of a resin, and is formed into a certain shape as described below. The socket 330 functions as an example of an outer component that is arranged at a position outside the grommet 320 in the communication hole 161 of the second housing 160.

At the inside of the socket 330, a passage that is capable of passing the electric cables 310 therethrough is formed, and there are plural entrances to the passage (two entrances in the exemplary embodiment), and there are plural exits 330c from the passage to the outside (three exits in the exemplary embodiment). Thus, in accordance with the existence of another component arranged at the outside of the housing 140, the exit of the electric cables 310 and the direction thereof can be arbitrary changed. Detailed description will be given as follows.

The lower component 340 has a supporting part 341 that supports the upper component 331, and an elliptic cylindrical part 342 that is formed into an elliptic cylinder and that has a penetration hole 342a for passing the plurality of electric cables 310 at the center thereof. Further, the lower component 340 has two crescent cylindrical parts 343 that are formed into crescent cylinders and project to the outside from the end surface on the side opposite to the side where the supporting part 341 of the elliptic cylindrical part 342 is arranged, at both sides in the long side direction of the ellipse. The supporting part 341, the elliptic cylindrical part 342 and the crescent cylindrical parts 343 are aligned in this order from the second connector 360 side in the electric cable hole direction.

The supporting part 341 has a lower facing surface 341a that faces an upper facing surface 331a of the upper component 331 to be described later, an outermost lower surface 341b that is an end surface on a side opposite to the elliptic cylindrical part 342 and is located on the outermost side in the communication hole 161 of the second housing 160, and lower side surfaces 341c that are side surfaces. The supporting part 341 has concave parts 341d for protrusions with which protrusions 332 of the upper component 331 to be described later are fitted. The concave parts 341d are concave from the lower facing surface 341a in one end direction of the shaft direction (downward direction in FIGS. 14A and 14B). Further, the supporting part 341 has a lower concave part 344 for the passage that is concave from the lower facing surface 341a in the one end direction of the shaft direction (downward direction in FIGS. 14A and 14B), and that forms a space for passing the electric cables 310 passed through the penetration hole 342a therethrough. The lower side surfaces 341c and the concave parts 341d for the protrusions are provided on both sides of the lower concave part 344 for the passage. The lower side surfaces 341c are formed at positions where the lower side surfaces 341c form spaces for not interfering with hooks 390 to be described later even if the hooks 390 are elastically deformed by the desired amount.

The lower concave part 344 for the passage is formed to be connected to the penetration hole 342a of the elliptic cylindrical part 342 at the end of the supporting part 341 on the grommet 320 side, and is configured to extend from the position to the outermost lower surface 341b. Since the lower concave part 344 for the passage extends to the outermost lower surface 341b, lower openings 344a are formed at the outermost lower surface 341b. In the exemplary embodiment, the lower concave part 344 for the passage branches into three passages from the elliptic cylindrical part 342 side to the outermost lower surface 341b to form three lower openings 344a at the outermost lower surface 341b.

To the supporting part 341, plural extending parts 344b that extend from the bottom of the lower concave part 344 for the passage in a direction intersecting with the electric hole direction (in the exemplary embodiment, the other end direction of the shaft direction (upward direction in FIGS. 14A and 14B)) are provided. The lower concave part 344 for the passage and the plural extending parts 344b will be described in detail later.

The elliptic cylindrical part 342 is provided with the hooks 390 at both ends in the long side direction of the ellipse. Each of the hooks 390 is basically formed into an elliptic cylindrical plate, projects from the end surface on the supporting part 341 side to the supporting part 341 side in the electric cable hole direction, and elastically deforms in the long side direction, that is, the direction intersecting with the divided direction of the lower component 340 and the upper component 331. The hooks 390 are formed so that the outer surface thereof is located along the outer peripheral surface of the elliptic cylindrical part 342. Each of the hooks 390 has an inclined surface 391 that is inclined with respect to the electric cable hole direction so as to project from the elliptic-cylindrical outer peripheral surface of the elliptic cylindrical part 342 to the outside, and a vertical surface 392 that is a surface spreading from the terminal end of the inclined surface 391 to the inner side of the long side direction so as to be in parallel to the long side direction, that is, a surface vertical to the electric cable hole direction, in the middle of the electric cable hole direction. Between the leading end of the inclined surface 391 and the body of the elliptic cylindrical part 342, a long hole 393 is formed so that the inclined surface 391 and the vertical surface 392 easily and elastically deform in the long side direction.

The upper component 331 has the upper facing surface 331a that faces the lower facing surface 341a of the supporting part 341 of the lower component 340, an outermost upper surface 331b that is an end surface on a side opposite to the elliptic cylindrical part 342 of the lower component 340 and is located on the outermost side in the communication hole 161 of the second housing 160, and upper side surfaces 331c that are side surfaces. To the upper facing surface 331a, two cylindrical protrusions 332 are provided in the long side direction of the ellipse of the elliptic cylindrical part 342. The protrusions 332 protrude from the upper facing surface 331a in the one end direction of the shaft direction. To the upper component 331, an upper concave part 334 for the passage that is concave from the upper facing surface 331a in the other end direction of the shaft direction (upper direction in FIGS. 14A and 14B) and forms a space for passing the electric cables 310 passed through the penetration hole 342a therethrough together with the lower concave part 344 for the passage of the supporting part 341 of the lower component 340 is provided.

The upper concave part 334 for the passage is concave so as to correspond to the lower concave part 344 for the passage of the lower component 340, is formed to be connected to the penetration hole 342a of the elliptic cylindrical part 342 of the lower component 340 at the end on the grommet 320 side, and is configured to extend from the position to the outermost upper surface 331b. Since the upper concave part 334 for the passage extends to the outermost upper surface 331b, upper openings 334a are formed at the outermost upper surface 331b. In the exemplary embodiment, three upper openings 334a are formed at positions corresponding to the three lower openings 344a formed in the outermost lower surface 341b of the lower component 340, and the upper concave part 334 for the passage branches into three passages from the end side on the grommet 320 side to the outermost upper surface 331b. In the state where the upper component 331 is attached to the lower component 340 and the upper facing surface 331a of the upper component 331 and the lower facing surface 341a of the lower component 340 are in contact with each other, the upper concave part 334 for the passage of the upper component 331 forms a space in which the plural electric cables 310 are introduced to the inside thereof from the grommet 320 side and exit from the outermost upper surface 331b side, together with the lower concave part 344 for the passage.

The upper side surfaces 331c are formed at positions where the upper side surfaces 331c form spaces for not interfering with hooks 390 provided to the lower component 340 even if the hooks 390 are elastically deformed by the desired amount.

In the state where the protrusions 332 of the upper component 331 are fitted with the concave parts 341d for the protrusions of the lower component 340, and the upper facing surface 331a of the upper component 331 and the lower facing surface 341a of the lower component 340 are in contact with each other, the outer peripheral surfaces of the upper component 331 and the supporting part 341 of the lower component 340 are formed to be the same as the outer peripheral surface of the elliptic cylindrical part 342.

The retaining component 336 is arranged between each of the hooks 390 provided at the both ends of the ellipse of the socket 330 in the long side direction and the lower side surface 341c of the lower component 340 and the upper side surface 331c of the upper component 331. The retaining component 336 is an example of a deformation suppressing component that is arranged at the inner side of the hook 390 in the state where the hook 390 is fitted with the concave part 162 formed in the second housing 160 and thereby suppressing elastic deformation of the hook 390. The retaining component 336 has a base 336a that extends in the electric cable hole direction and is formed into a cuboid, and a bending part 336b that extends from the outer end of the base 336a in the electric cable hole direction to the inner side of the ellipse in the long side direction.

The base 336a has a lower protrusion 336c that projects from one end surface in the shaft direction (lower end surface in FIGS. 14A and 14B) to the lower side (lower component 340 side), an upper protrusion 336d that projects from the other end surface in the shaft direction (upper end surface in FIGS. 14A and 14B) to the upper side (upper component 331 side), and an inner protrusion 336e that projects from the inner end surface in the long side direction of the ellipse to the inner side. Each of the lower protrusion 336c, the upper protrusion 336d and the inner protrusion 336e has an inclined surface that is inclined with respect to the electric cable hole direction and a vertical surface that spreads from the terminal end of the inclined surface so as to be in parallel to a direction vertical to the electric cable hole direction.

The bending part 336b has an inclined surface that is inclined with respect to the long side direction of the ellipse of the socket 330 at the tip end and at the inner side in the electric cable hole direction. At the central part of the bending part 336b in the shaft direction, a concave part 336f that is concave from the tip end is formed.

Next, description will be given for a space for passing the electric cables 310 therethrough in the socket 330.

Figure 16:
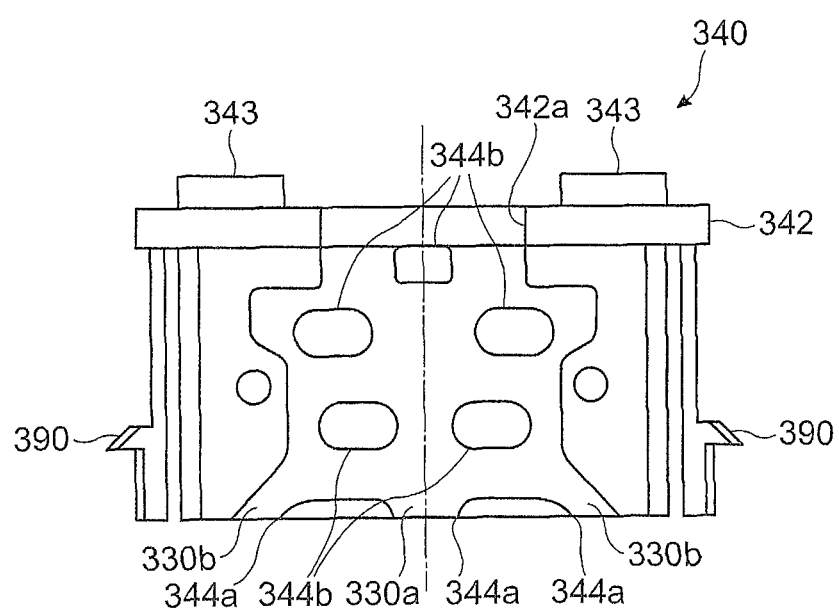
FIG. 16 is a view of the lower component seen from the upper component side.

FIG. 16 is a view of the lower component 340 seen from the upper component 331 side. In FIG. 16, the elliptic cylindrical part 342 is illustrated to be located on the upper side. Hereinafter, the description will be given by setting the elliptic cylindrical part 342 side to be the upper side, the lower opening 344a side to be the lower side, the center line as the center of the penetration hole 342a of the elliptic cylindrical part 342 to be a center line in the lateral direction.

The lower concave part 344 for the passage has a symmetric shape against the centerline in the lateral direction. One of the three lower openings 344a exists on the center line, and the other two lower openings 344a exist on the left and light sides, respectively. In the case where the passage from the penetration hole 342a to the lower opening 344a located at the center is set to be a main passage 330a, branched passages 330b that are branched from the main passage 330a are provided on the upper sides of the two lower openings 344a located at the left and light sides, respectively. Each of the branched passages 330b is formed to extend to the outer side in a direction intersecting with the center line direction. The upper concave part 334 for the passage is symmetrical to the lower concave part 344 for the passage against the plane orthogonal to the shaft direction. The exits 330c for the electric cables 310 are formed by the lower openings 344a of the lower component 340 and the upper openings 334a of the upper component 331.

The plural extending parts 344b provided in the lower concave part 344 for the passage are arranged so as to be symmetrical against the centerline in the lateral direction, and the shapes thereof are also bilaterally symmetrical. In the exemplary embodiment, five extending parts 344b are provided, and one of them is provided on the centerline, and at the end on the elliptic cylindrical part 342 side (upper end). As for the other four extending parts 344b, two extending parts 344b are provided on each of the left and right sides, and the two extending parts 344b located on one side are provided to be aligned in the centerline direction. The upper one of the two extending parts 344b located on one side is provided to be located outside the lower one of the extending parts 344b. The extending part 344b provided on the centerline configures two entrances to the inside of the socket 330 respectively provided on the left and right sides. Note that, a space for passing the electric cables 310 therethrough is secured on the periphery of the extending parts 344b.

Figure 17A:
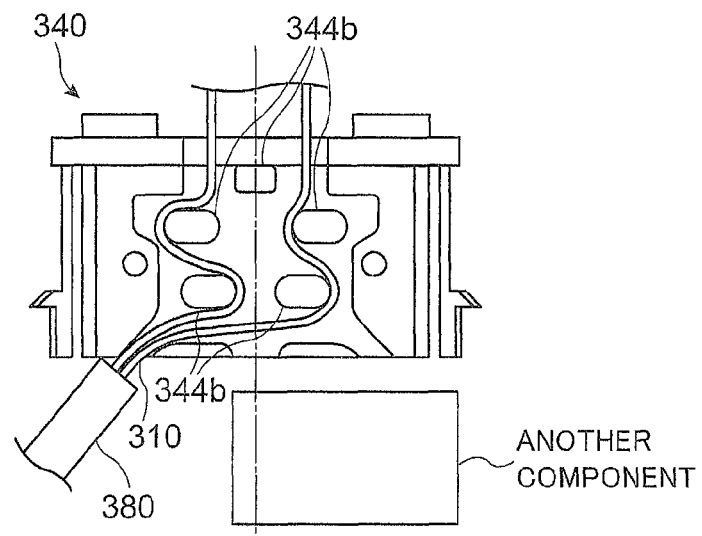
FIGS. 17A to 17C are views for illustrating states in which electric cables are passed through the inside of the socket.
Figure 17B:
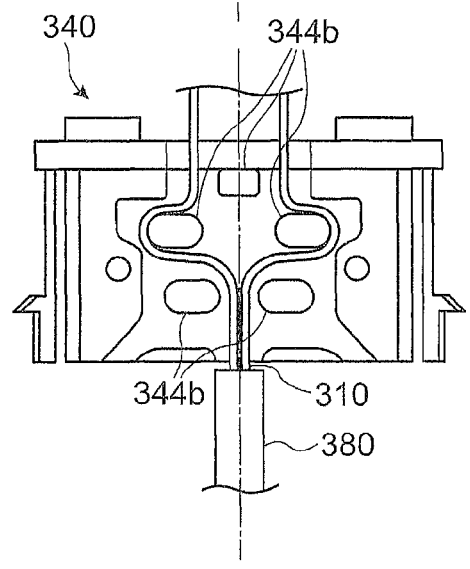
Figure 17C:
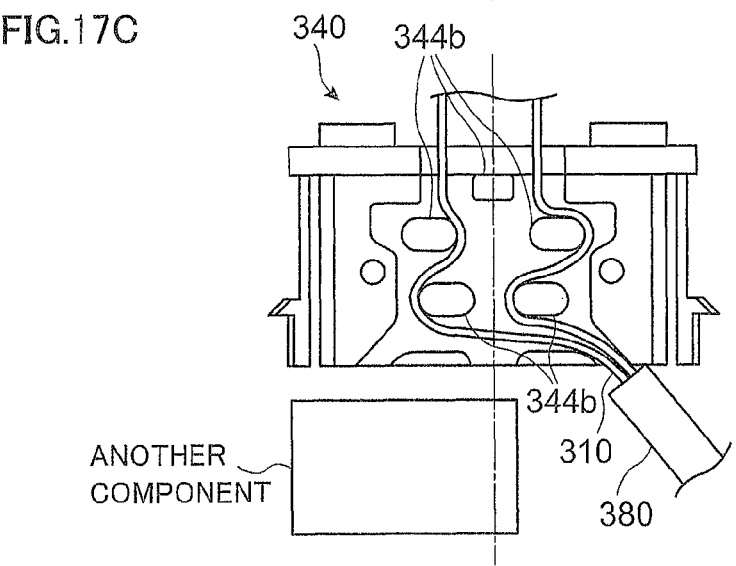

FIGS. 17A to 17C are views for illustrating states in which electric cables 310 are passed through the inside of the socket 330. FIG. 17A is a view for illustrating a state where all electric cables 310 exit from the left-sided exit 330c, FIG. 17B is a view for illustrating a state where all electric cables 310 exit from the central exit 330c, and FIG. 17C is a view for illustrating a state where all electric cables 310 exit from the right-sided exit 330c. Note that, in FIGS. 17A to 17C, two electric cables 310 located on the lower side out of the four electric cables 310 are shown.

In the socket 330 according to the exemplary embodiment, since the plural extending parts 344b are provided, it is possible to adjust, at the inside of the socket 330, the length of the electric cables 310 extending at the outside of the socket 330. For example, as shown in FIG. 17A, in the case where all electric cables 310 are configured to exit from the left-sided exit 330c, the electric cable 310 entering from the left-sided entrance is passed through the left side of the extending part 344b located on the left-upper side and the right side of the extending part 344b located on the left-lower side, and is configured to exit from the left-sided exit 330c through the branched passage 330b located on the upper side of the left-sided exit 330c. On the other hand, the electric cable 310 entering from the right-sided entrance is passed through the left side of the extending part 344b located on the right-upper side and the right side of the extending part 344b located on the right-lower side, and is configured to exit from the left-sided exit 330c through the branched passage 330b located on the upper side of the left-sided exit 330c.

Thus, since the extending parts 344b located on the left-upper side and the right-upper side are provided to be located at the outside of the extending parts 344b on the left-lower side and the right-lower side, respectively, it is possible to set the lengths of all electric cables 310 extending at the outside of the socket 330 to be the same. In other words, the arrangement positions and shapes of the plural extending parts 344b may be configured so that adjustment for approximately equalizing the lengths of all electric cables 310 extending at the outside of the socket 330 can be performed.

By passing the electric cables 310 therethrough as shown in FIG. 17A when all electric cables 310 exit from the left-sided exit 330c, even if any force acts on the electric cables 310 at the outside of the socket 330, the force is difficult to be transferred to the section of the grommet 320 where the electric cables 310 are held. That is, even if any force acts on the electric cables 310 at the outside of the socket 330, the electric cables 310 entering from the left-sided entrance is difficult to move since the electric cables 310 are brought into contact with the extending parts 344b located on the left-lower side and the left-upper side, and thereby the force is difficult to be transferred to the electric cable holding part of the grommet 320. Further, the electric cable 310 entering from the right-sided entrance is difficult to move since the electric cable 310 is brought into contact with the extending parts 344b on the right-lower side and the right-upper side, and the force is difficult to be transferred to the electric cable holding part of the grommet 320.

In the case where all electric cables 310 are configured to exit from the right-sided exit 330c, the electric cable 310 entering from the left-sided entrance and the electric cable 310 entering from the right-sided entrance are passed therethrough as shown in FIG. 17C, and thereby an effect similar to the aforementioned effect can be obtained.

In the case where all electric cables 310 are configured to exit from the central exit 330c, the electric cable 310 entering from the left-sided entrance is passed through the left side of the extending part 344b located on the left-upper side and the right side of the extending part 344b located on the left-lower side, and is configured to exit from the central exit 330c. On the other hand, the electric cable 310 entering from the right-sided entrance is passed through the right side of the extending part 344b located on the right-upper side and the left side of the extending part 344b located on the right-lower side, and is configured to exit from the central exit 330c. Thereby, even if any force acts on the electric cables 310 at the outside of the socket 330, the electric cable 310 entering from the left-sided entrance is difficult to move since the electric cable 310 is brought into contact with the extending parts 344b located on the left-lower side and the left-upper side, and force is difficult to be transferred to the electric cable holding part of the grommet 320. In addition, the electric cable 310 entering from the right-sided entrance is difficult to move since the electric cable 310 is brought into contact with the extending parts 344b located on the right-lower side and the right-upper side, and force is difficult to be transferred to the electric cable holding part of the grommet 320.

As mentioned above, the socket 330 according to the exemplary embodiment has plural introducing parts that are configured with the lower concave part 344 for the passage, the upper concave part 334 for the passage, the extending part 344b arranged on the centerline and the like, and introduce the electric cables 310 into the inside, and plural exiting parts that are configured with the plural exits 330c, the main passage 330a, the plural branched passages 330b and the like, and take the introduced electric cables 310 out in different directions. By using the socket 330 according to the exemplary embodiment, it is possible to arbitrarily change the exit and direction of the electric cables 310 in accordance with the existence of another component arranged at the outside of the housing 140 as shown in FIGS. 17A to 17C, and thereby it is possible to inhibit the plural electric cables 310 bundled by the second cover 380 from interfering with another component.

Figure 18:
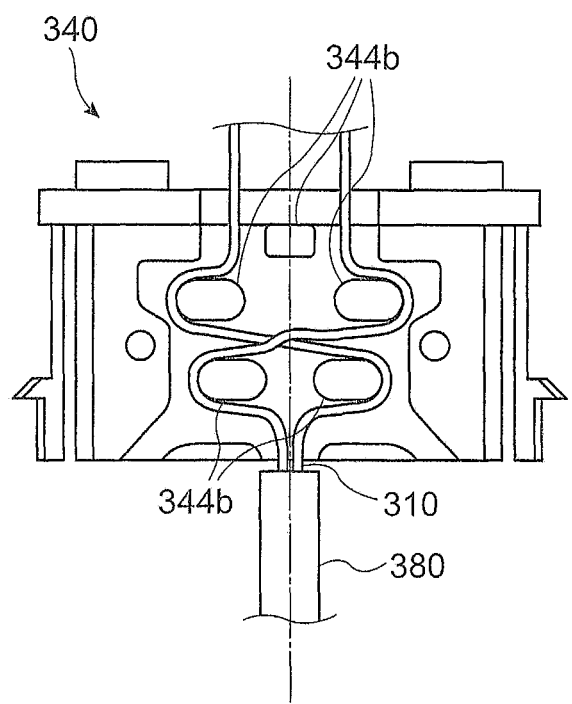
FIG. 18 is a view for illustrating another state where all electric cables are passed therethrough from the central exit.

FIG. 18 is a view for illustrating another state where all electric cables 310 are passed therethrough from the central exit 330c. Note that, also in FIG. 18, two electric cables 310 located on the lower side out of the four electric cables 310 are shown.

In the case where all electric cables 310 are configured to exit from the central exit 330c, the electric cable 310 entering from the left-sided entrance is passed through the left side of the extending part 344b located on the left-upper side and the right side of the extending part 344b located on the right-lower side, and is configured to exit from the central exit 330c, as shown in FIG. 18. On the other hand, the electric cable 310 entering from the right-sided entrance is passed through the right side of the extending part 344b located on the right-upper side and the left side of the extending part 344b on the left-lower side, and is configured to exit from the central exit 330c. Thereby, even if any force acts on the electric cables 310 at the outside of the socket 330, the electric cable 310 entering from the left-sided entrance is difficult to move since the electric cable 310 is brought into contact with the extending parts 344b located on the left-upper side and the right-lower side, and the force is difficult to be transferred to the electric cable holding part of the grommet 320 in comparison with the state shown in FIG. 17B. Further, the electric cable 310 entering from the right-sided entrance is difficult to move since the electric cable 310 is brought into contact with the extending parts 344b located on the right-upper side and the left-lower side, and the force is difficult to be transferred to the electric cable holding part of the grommet 320 in comparison with the state shown in FIG. 17B.

The harness component 300 having the aforementioned configuration is assembled as follows.

That is, first, the electric cables 310 are inserted to the plural electric cable holes 323 formed in the grommet 320, respectively. Then, an adhesive agent is applied to the inner side of the cylindrical part 322 of the grommet 320, and positioning is conducted so that the plural electric cables 310 are prevented from moving with respect to the grommet 320. The plural electric cables 310 are bundled by the first cover 370.

Thereafter, the plural electric cables 310 arranged on the cylindrical part 322 side of the grommet 320 are passed through the penetration hole 342a of the elliptic cylindrical part 342 of the socket 330, are fitted with the lower concave part 344 for the passage of the lower component 340, and are configured to exit from any one of the lower openings 344a. Then, the upper component 331 is attached to the lower component 340. That is, the protrusions 332 of the upper component 331 are fitted with the concave parts 341d for the protrusions of the lower component 340, and the upper facing surface 331a of the upper component 331 is brought into contact with the lower facing surface 341a of the lower component 340. After that, the plural electric cables 310 extending from the socket 330 are bundled by the second cover 380. Note that, since the adhesive agent is applied to the inner side of the cylindrical part 322 of the grommet 320, even if any force is applied to the plural electric cables 310 when the plural electric cables 310 are passed through the inside of the socket 330, displacement of the electric cables 310 is suppressed.

Subsequently, the tip end of the plural electric cables 310 bundled by the second cover 380 is connected to the second connector 360. On the other hand, the tip end of the plural electric cables 310 bundled by the first cover 370 which is arranged at the side opposite to the side where the cylindrical part 322 of the grommet 320 is arranged is connected to the first connector 350.

The harness component 300 is attached to the electric power steering apparatus 100 as follows.

That is, in the state where the first rotary shaft 110, the second rotary shaft 120, the sensing device 10 and the like are attached to the first housing 150 and the second housing 160 before the third housing 170 is attached, the harness component 300 is passed through the communication hole 161 formed in the second housing 160, from the first connector 350 side. The grommet 320 and the socket 330 are pressed until the projections 324 of the grommet 320 are brought into contact with and are fitted with the inner peripheral surface of the communication hole 161 and the hooks 390 of the socket 330 are fitted with the concave parts 162 formed in the second housing 160. When the socket 330 is inserted into the communication hole 161, the inclined surfaces 391 of the hooks 390 are brought into contact with the peripheral wall of the communication hole 161 in the second housing 160 and elastically deform, and then by further insertion, the inclined surfaces 391 are fitted with the concave parts 162 of the second housing 160, and thereby recovering from the deforming state. The grommet 320 acts against the friction force generated with the peripheral wall 163 of the communication hole 161 and moves to the inner side by making the surface on the side where the cylindrical part 322 of the elliptic cylindrical part 321 is arranged pressed by the crescent cylindrical parts 332 of the socket 330. As described above, the grommet 320 and the socket 330 are mounted on the second housing 160. Then, each of the retaining components 336 is inserted into a space between corresponding one of the hooks 390 and the lower side surface 341c of the lower component 340 and the upper side surface 331c of the upper component 331. Further, the first connector 350 is inserted into a terminal of the flat cable cover 60, and the second connector 360 is inserted into the terminal of the ECU 200.

Meanwhile, in the case where the harness component 300 is detached, after the first connector 350 is detached from the terminal of the flat cable cover 60, the retaining components 336 are pulled out, and the grommet 320 and the socket 330 are detached from the communication hole 161 of the second housing 160 by pulling the hooks 390 of the socket 330 toward the front side from the outside of the second housing 160 while the hooks 390 are elastically deformed to the inner side. Since the concave part 336f is formed in the retaining component 336, it is possible to easily detach the retaining component 336 by inserting, for example, a tip end of a flathead screwdriver into the concave part 336f. Thereafter, the first connector 350 is pulled away from the communication hole 161 of the second housing 160, and the harness component 300 is detached.

In the harness component 300 having the aforementioned configuration and mounted on the second housing 160, as the grommet 320 is fitted with the second housing 160, the inside of the housing 140 is sealed by, mainly the projections 324 of the grommet 320. Further, by making the projections 324 of the grommet 320 pressed by the peripheral wall 163 of the communication hole 161 of the second housing 160, the grommet 320 elastically deforms so that the diameter of the electric cable holes 320 becomes small, and the plural electric cables 310 are more strongly held. The plural electric cables 310 are bonded by the adhesive agent applied to the inner side of the cylindrical part 322 of the grommet 320. The plural electric cables 310 are bent by the plural extending parts 344 at the inside of the socket 330. Thereby, after the attachment, even if any force acts on the plural electric cables 310 bundled by the second cover 380 from the outside of the housing 140, the force is difficult to be transferred to the section of the grommet 320 where the electric cables 310 are held, and the electric cables 310 are inhibited from moving with respect to the grommet 320. Note that, the size of the cylindrical part 322 of the grommet 320 in the radial direction is set so as to have a space with the crescent cylindrical parts 343 and the inner surface of the penetration hole 342a of the elliptic cylindrical part 342 of the socket 330, and since the penetration hole 342a of the elliptic cylindrical part 342 is located in the electric cable hole direction of the cylindrical part 322, the diameter of the electric cable holes 323 of the grommet 320 becomes smaller. Thus, the grommet 320 is allowed to elastically deform so as to become large in the electric cable hole direction.

Since each of the retaining components 336 is inserted into a space between corresponding one of the hooks 390 and the lower side surface 341c of the lower component 340 and the upper side surface 331c of the upper component 331, the hooks 390 of the socket 330 are inhibited from deforming to the inner side. Since each of the lower protrusion 336c, the upper protrusion 336d and the inner protrusion 336e of the retaining component 336 has the inclined surface and the vertical surface, the retaining component 336 is difficult to come off while the retaining component 336 is easily inserted. Further, by bringing the vertical surfaces 392 of the hooks 390 of the socket 330 into contact with the vertical surfaces 162a of the concave parts 162 of the second housing 160, the socket 330 and the grommet 320 are inhibited from coming off the second housing 160. Accordingly, even if any force acts on the plural electric cable 310 bundled by the second cover 380 from the outside of the housing 140, the grommet 320 is difficult to come off the communication hole 161, and thereby the electric cables 310 is inhibited from coming off the first connector 350, and the connecting terminal 62 into which the first connector 350 has been inserted is inhibited from being broken.

Since the lower protrusion 336c of the retaining component 336 inserted into a space between the hook 390 and the lower side surface 341c of the lower component 340 and the upper side surface 331c of the upper component 331 presses the lower component 340 toward the lower side, and the upper protrusion 336d thereof presses the upper component 331 toward the upper side, the upper component 331 and the lower component 340 are easily brought into contact with the inner peripheral surface of the peripheral wall 163 forming the communication hole 161. Thereby, attrition of the upper component 331 and the lower component 340 due to frequent contact with the inner peripheral surface of the peripheral wall 163 forming the communication hole 161 with strong force is suppressed.

Even if the harness component 300 alone is carried, since the electric cables 310 are held so as not to move from the grommet 320, an operator for attaching the harness component 300 can easily attach the harness component 300 without attention to the length of the electric cables 310 from the grommet 320 to the first connector 350.

Figure 19A:
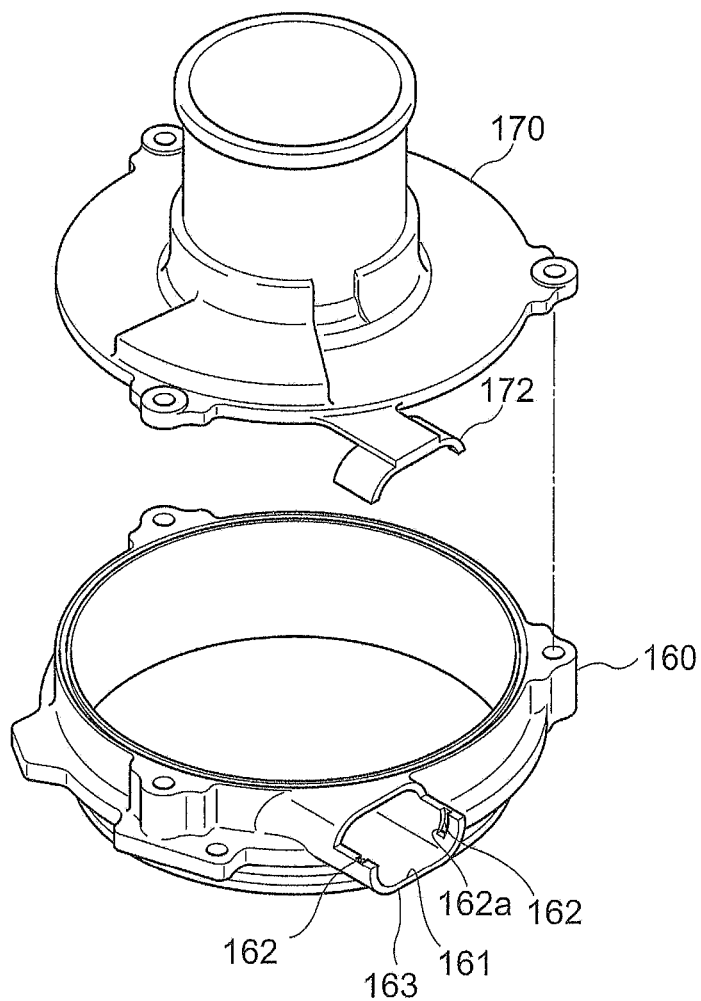
FIGS. 19A and 19B are views for illustrating another configuration of the housing.
Figure 19B:
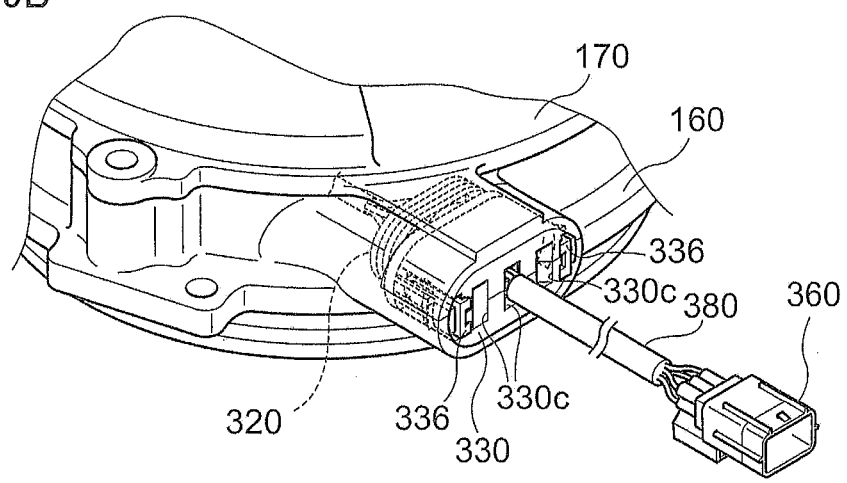

FIGS. 19A and 19B are views for illustrating another configuration of the housing 140.

A part or all of the outer communication hole 161b described with FIGS. 2 and 15A to 15C may be formed by the second housing 160 and the third housing 170 as shown in FIGS. 19A and 19B. In other words, the third housing 170 is fixed to the second housing 160 with bolts, and thereby the outer communication hole 161b may be formed by the second housing 160 and the third housing 170. That is, as shown in FIG. 19A, a wall surface of the outer communication hole 161b in the second housing 160 on the other end side in the shaft direction (upward direction in FIGS. 1A and 1B) is removed, and the outer communication hole 161b is opened. On the other hand, to the third housing 170, an extending part 172 that extends from a fastening surface with the second housing 160 to the outside in the electric cable hole direction is provided.

When the harness component 300 is attached to the electric power steering apparatus 100, after the grommet 320 and the lower component 340 and the upper component 331 of the socket 330 are mounted on the second housing 160 and the first connector 350 is inserted into the terminal of the flat cable cover 60, the third housing 170 is attached to the second housing 160, similarly to the aforementioned exemplary embodiment. Thereby, as shown in FIG. 19B, the upper surface of the socket 330 is covered by the extending part 172 of the third housing 170. Then, each of the retaining components 336 is inserted into a space between the hook 390 and the lower side surface 341c of the lower component 340 and the upper side surface 331c of the upper component 331.

When the harness component 300 is detached, the upper surface of the socket 330 is opened if the third housing 170 is detached from the second housing 160. Thus, it is possible to easily detach the socket 330 and the grommet 320 from the second housing 160.

Note that, in the aforementioned exemplary embodiment, the socket 330 is configured with the upper component 331 and the lower component 340 as a pair of divided components dividable in the shaft direction. However, it is not limited to the above configuration. For example, the socket 330 may be configured with a pair of divided components dividable in the shaft direction and the electric cable hole direction, and the exits 330c for making the plural electric cables 310 exit may be aligned in the shaft direction. As passages for the electric cables 310 at the inside of the socket 330, a passage that is inclined to one end direction of the shaft direction (downward direction in FIGS. 14A and 14B) with respect to the electric cable hole direction, a passage extending in the electric cable hole direction, and a passage inclined to the other end direction of the shaft direction (upward direction in FIGS. 14A and 14B) with respect to the electric cable hole direction are configured. Thereby, since the exit and the direction of the electric cables 310 can be arbitrarily changed in accordance with the existence of another component arranged at the outside of the housing 140, it is possible to inhibit the plural electric cables 310 bundled by the second cover 380 from interfering with another component.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relative angle sensing device comprising:
   a sensor that is contained in a housing in which a communication hole communicating inside and outside is formed, and outputs an electric signal according to a relative rotation angle between two rotary shafts coaxially arranged;

an electric cable that transmits the electric signal outputted from the sensor to a device arranged at outside of the housing;

an electric cable holding member that is fitted with the communication hole of the housing and that holds the electric cable; and an outer component that is arranged at a position outside the electric cable holding member in the communication hole of the housing; wherein the outer component comprises an introducing part that introduces the electric cable into inside thereof, and a plurality of exiting parts that make the electric cable having been introduced through the introducing part exit to outside in different directions.

2. The relative angle sensing device according to claim 1, wherein the outer component further comprises a plurality of extending parts that extend in a direction intersecting with a hole direction of the communication hole of the housing, between the introducing part and the plurality of exiting parts.

3. The relative angle sensing device according to claim 2, wherein the outer component has a plurality of the introducing parts, and the plurality of extending parts are provided so that it is possible for a plurality of the electric cables that are introduced from the different introducing parts and exit from one exiting part out of the plurality of exiting parts to have approximately the same length at the outside of the outer component.

4. The relative angle sensing device according to claim 2, wherein the outer component has a pair of divided components that is dividable in a direction intersecting with the hole direction of the communication hole of the housing, and the plurality of extending parts are formed on one divided component out of the pair of the divided components so as to extend toward the other divided component.

5. The relative angle sensing device according to claim 3, wherein the outer component has a pair of divided components that is dividable in a direction intersecting with the direction of the communication hole of the housing, and the plurality of extending parts are formed on one divided component out of the pair of the divided components so as to extend toward the other divided component.

6. An electric power steering apparatus comprising:

a sensor that outputs an electric signal according to a relative rotation angle between two rotary shafts coaxially arranged;

a housing that contains the sensor and forms a communication hole communicating inside and outside;

an electric cable that transmits the electric signal outputted from the sensor to a device arranged at outside of the housing;

an electric cable holding member that is fitted with the communication hole of the housing and that holds the electric cable; and an outer component that is arranged at a position outside the electric cable holding member in the communication hole of the housing; wherein the outer component comprises an introducing part that introduces the electric cable into inside thereof, and a plurality of exiting parts that make the electric cable having been introduced through the introducing part exit to outside in different directions.

* * * * *